United States Patent
Kim et al.

(10) Patent No.: US 11,531,489 B2
(45) Date of Patent: Dec. 20, 2022

(54) INTEGRATED CIRCUIT DEVICE, SYSTEM-ON-CHIP INCLUDING THE SAME, AND PACKET PROCESSING METHOD

(71) Applicant: Samsung Electronics Co., Ltd., Suwon-si (KR)

(72) Inventors: Jinwoo Kim, Seoul (KR); Jaeyong Jeong, Hwaseong-si (KR); Myunghyun Jo, Hwaseong-si (KR); Wonhee Cho, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 355 days.

(21) Appl. No.: 16/811,682

(22) Filed: Mar. 6, 2020

(65) Prior Publication Data
US 2021/0026553 A1 Jan. 28, 2021

(30) Foreign Application Priority Data
Jul. 24, 2019 (KR) .................. 10-2019-0089795

(51) Int. Cl.
*G06F 3/06* (2006.01)

(52) U.S. Cl.
CPC .......... *G06F 3/0652* (2013.01); *G06F 3/0604* (2013.01); *G06F 3/0679* (2013.01)

(58) Field of Classification Search
CPC .... G06F 3/0652; G06F 3/0604; G06F 3/0679; G06F 3/0659; G06F 15/163; G06F 15/7807; G06F 9/3836
See application file for complete search history.

(56) References Cited

U.S. PATENT DOCUMENTS

| | | | |
|---|---|---|---|
| 5,325,493 A | 6/1994 | Herrell et al. | |
| 7,304,999 B2 | 12/2007 | Sukonik et al. | |
| 8,472,311 B2 | 6/2013 | Rodgers et al. | |
| 8,619,568 B2 * | 12/2013 | Ding | H04L 45/24 370/230.1 |
| 8,943,236 B1 | 1/2015 | Usmani | |
| 9,553,853 B2 | 1/2017 | Kantecki et al. | |

(Continued)

FOREIGN PATENT DOCUMENTS

KR 101463783 B1 11/2014

*Primary Examiner* — David Yi
*Assistant Examiner* — Alan Otto
(74) *Attorney, Agent, or Firm* — Harness, Dickey & Pierce, P.L.C.

(57) ABSTRACT

A system-on-chip includes a first intellectual property (IP) generating a plurality of request packets; and a second IP generating a plurality of response packets based on the plurality of request packets, wherein the second IP includes a plurality of processing elements processing the plurality of request packets and generating the plurality of response packets; a distributer, when the plurality of request packets are input from the first IP, determining a scheduling policy based on a packet type of the plurality of request packets and distributing the plurality of request packets to the plurality of processing elements according to the determined scheduling policy; and an aggregator, when the plurality of response packets are received from each of the plurality of processing elements, aggregating the plurality of response packets according to the determined scheduling policy.

20 Claims, 14 Drawing Sheets

(56) References Cited

U.S. PATENT DOCUMENTS

| | | | | |
|---|---|---|---|---|
| 2010/0262762 A1* | 10/2010 | Borchers | ............... | G06F 3/0644 |
| | | | | 711/E12.001 |
| 2014/0317358 A1* | 10/2014 | Meier | ................. | G06F 12/0817 |
| | | | | 711/141 |
| 2016/0285992 A1* | 9/2016 | Katsev | ................ | H04L 67/2852 |
| 2016/0373346 A1 | 12/2016 | Hirota | | |
| 2016/0378402 A1* | 12/2016 | Amidi | ................... | G06F 3/0604 |
| | | | | 711/103 |

* cited by examiner

FIG. 2

| Packet Pair | Command | Scheduling Policy | Ordering |
|---|---|---|---|
| {0x3, 0x30} | Write | Modular | Yes |
| {0x4, 0x40} | Read | Round Robin | No |

FIG. 3

| Packet Pair | Command | Scheduling Policy | Ordering |
|---|---|---|---|
| {0x3, 0x30} | Write | Modular | Yes |
| {0x4, 0x40} | Read | Modular | No |

INTEGRATED CIRCUIT DEVICE, SYSTEM-ON-CHIP INCLUDING THE SAME, AND PACKET PROCESSING METHOD

CROSS-REFERENCE TO RELATED APPLICATION

This application claims the benefit of Korean Patent Application No. 10-2019-0089795, filed on Jul. 24, 2019, in the Korean Intellectual Property Office, the disclosure of which is incorporated herein in its entirety by reference.

BACKGROUND

Example embodiments of the inventive concepts relate to a packet processing method, an integrated circuit device, and/or a system on a chip (SoC). For example, at least some example embodiments relate to a method of distributing and processing packets to a plurality of processing elements according to a scheduling policy determined according to a packet type of a plurality of request packets, an integrated circuit device, and/or a system on a chip (SoC) implementing same.

Recently, the use of a SoC integrating a plurality of intellectual properties (IP), wherein the plurality of IPs perform different functions from each other, on a single chip has become common. In addition, according to high performance requirements of users, various methods for improving the throughput of the IP have been applied to the SoC.

SUMMARY

Example embodiments of the inventive concepts provide an integrated circuit device achieving improved processing performance by using a plurality of processing elements while not requiring design changes of surrounding components, a system on a chip (SoC), and a packet processing method implanting same.

According to an example embodiment of the inventive concepts, there is provided a system-on-chip including first processing circuitry configured as a first intellectual property (IP) to generate a plurality of request packets; and second processing circuitry configured as a second IP to generate a plurality of response packets based on the plurality of request packets by, determining a scheduling policy based on a packet type of the plurality of request packets and distributing the plurality of request packets to a plurality of processing elements according to the scheduling policy when the plurality of request packets are input from the first IP, processing, via the plurality of processing elements, the plurality of request packets to generate the plurality of response packets, and aggregating the plurality of response packets according to the scheduling policy, when the plurality of response packets are received from the plurality of processing elements.

According to another example embodiment of the inventive concepts, there is provided an integrated circuit device including processing circuitry configured to function as an intellectual property (IP) to generate a plurality of response packets by, determining a scheduling policy based on a packet type of a plurality of request packets, when the plurality of request packets are input from the outside, distributing the plurality of request packets to a plurality of processing elements according to the scheduling policy, and aggregating the plurality of response packets according to the scheduling policy, when the plurality of response packets are received from the plurality of processing elements.

According to another example embodiment of the inventive concepts, there is provided a packet processing method including determining a scheduling policy based on a packet type of a plurality of request packets, when a plurality of request packets are input; distributing the plurality of request packets to a plurality of processing elements according to the scheduling policy; processing the plurality of request packets through the plurality of processing elements to generate a plurality of response packets; and aggregating the plurality of response packets according to the scheduling policy.

BRIEF DESCRIPTION OF THE DRAWINGS

Example embodiments of the inventive concepts will be more clearly understood from the following detailed description taken in conjunction with the accompanying drawings in which:

FIG. 2 is a diagram illustrating an example embodiment of packet aggregation information according to an example embodiment of the inventive concepts;

FIG. 3 is a diagram illustrating an example embodiment of packet aggregation information according to an example embodiment of the inventive concepts;

DETAILED DESCRIPTION

Figure 1:
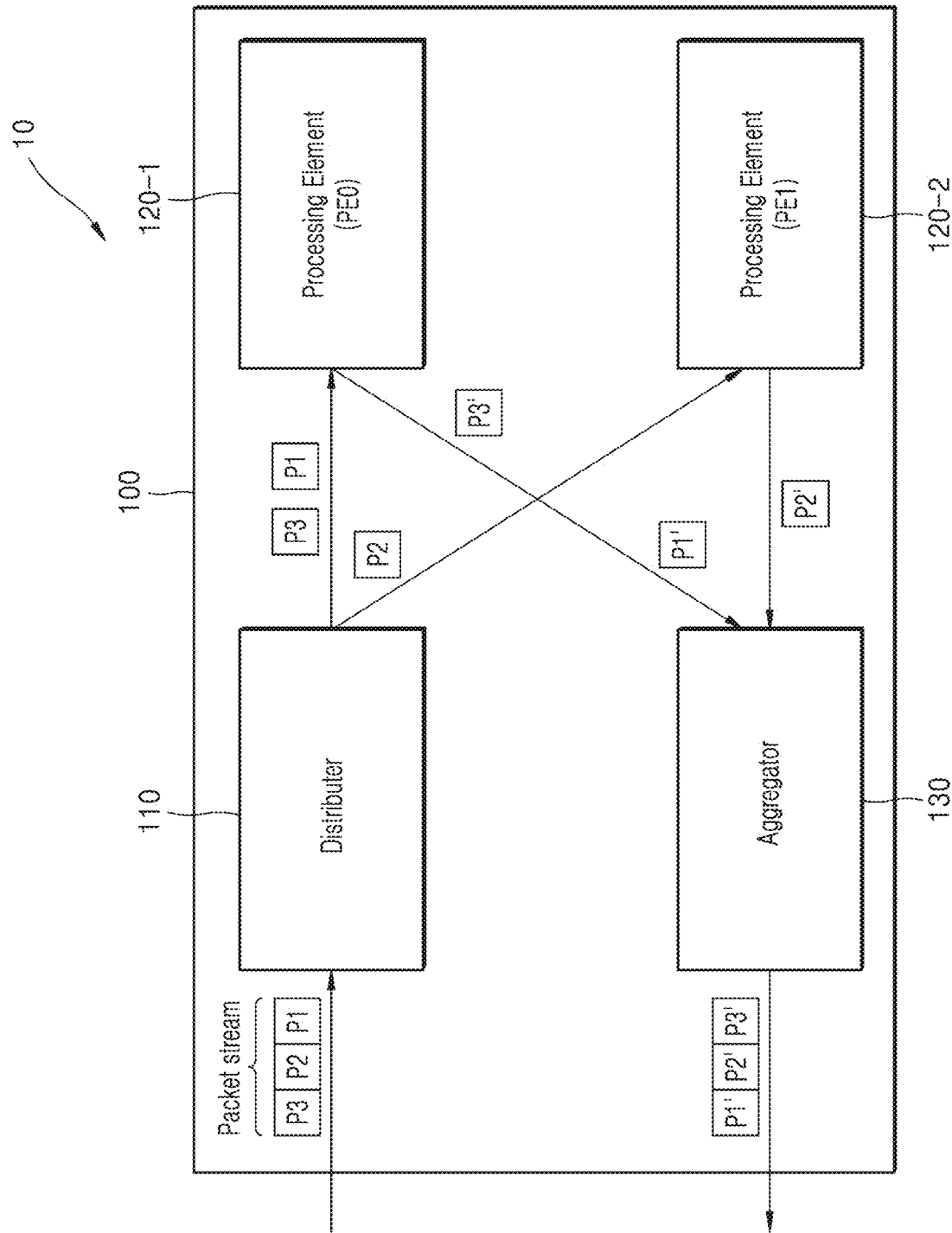
FIG. 1 is a block diagram illustrating an example embodiment of an integrated circuit device according to an example embodiment of the inventive concepts.

FIG. 1 is a block diagram illustrating an example of an integrated circuit device 10 according to an example embodiment of the inventive concepts.

Referring to FIG. 1, the integrated circuit (IC) device 10 may include an intellectual property (IP) 100, and the IP 100 may include a distributer 110, a plurality of processing elements 120-1 and 120-2, and an aggregator 130.

The IP 100 may include an IP configured to perform at least one particular operation. For example, the IP 100 of the IC device 10 may include an IP included in a memory controller and configured to perform particular operations of the memory controller. Hereinafter, for convenience of explanation, it is assumed that the IC device 10 is included in the memory controller.

When a request packet requesting a particular operation is externally input, the IP 100 may perform the particular operation, and as a result, generate a response packet and output the response packet to the outside. A plurality of request packets P1, P2, and P3 requesting one particular operation may be input to the IP 100 in a packet stream.

The distributer 110 may distribute the plurality of input request packets P1, P2, and P3 to the plurality of processing elements 120-1 and 120-2. In detail, the distributer 110 may distribute the plurality of request packets P1, P2, and P3 to the plurality of processing elements 120-1 and 120-2 according to a scheduling policy. Herein, the scheduling policy indicates a particular method that request packets are distributed to the plurality of processing elements 120-1 and 120-2 and response packets are aggregated from the plurality of processing elements 120-1 and 120-2.

The scheduling policy may include at least one of a broadcast policy, a modular policy, and a round robin policy, wherein the broadcast policy distributes each request packet to all of the plurality of processing elements 120-1 and 120-2, the modular policy distributes request packets to the plurality of processing elements 120-1 and 120-2 based on a value obtained by applying a remainder arithmetic to a value of a preset field of a header of a request packet, and the round robin policy alternately distributes request packets to the plurality of processing elements 120-1 and 120-2, and a scheduling policy separate from the above methods may be used. An example embodiment of distributing request packets according to the above-stated scheduling policies will be described below with reference to FIGS. 5 to 7B.

The distributer 110 may determine a scheduling policy based on packet types of the plurality of request packets P1, P2, and P3 and distribute the plurality of request packets P1, P2, and P3 to the plurality of processing elements 120-1 and 120-2 according to the determined scheduling policy.

In detail, the distributer 110 may check a packet type included in a header of each of the plurality of request packets P1, P2, and P3 and determine a scheduling policy corresponding to the checked packet type.

Herein, the packet type indicates information indicating what command a packet requests when the packet type is a request packet, and indicates information indicating what type of response a packet makes when the packet type is a response packet.

For example, when a command included in a request packet is an erase command or a trim command, the distributer 110 may determine the scheduling policy to be the broadcast policy. In addition, when a command included in the request packet is a read command or a write command, the distributer 110 may determine the scheduling policy to be the modular policy or the round robin policy. A method of determining the scheduling policy according to a command is not limited to the above example embodiment.

In addition, the plurality of request packets P1, P2, and P3 requesting one command may be continuously input in the IP 100. In this case, packet types of the plurality of request packets P1, P2, and P3 may be the same as each other. In addition, a plurality of response packets corresponding to the plurality of request packets P1, P2, and P3 may also have the same packet type.

The distributer 110 may further determine whether ordering is required based on the packet type of the plurality of request packets P1, P2, and P3. Herein, ordering indicates whether the plurality of response packets are required to be aggregated in an order in which the plurality of request packets are distributed.

For example, when the packet type of the plurality of request packets P1, P2, and P3 is a write command, the distributer 110 may perform ordering, and when the packet type of the plurality of request packets P1, P2, and P3 is a read, erase, or trim command, the distributer 110 may determine not to perform ordering.

In addition, when the distributer 110 determines that ordering is required, the distributer 110 may generate order information while distributing the plurality of request packets P1, P2, and P3 to the plurality of processing elements 120-1 and 120-2. Herein, the order information indicates information in which a processing element identifier PE ID, to which a plurality of request packets are distributed, is recorded according to a distribution order of the plurality of request packets. According to an example embodiment, an ordering first in first out (FIFO) may be used, instead of the order information, to input the processing element identifier PE ID, to which the request packets are distributed, according to the distribution order.

The plurality of processing elements 120-1 and 120-2 may perform a particular operation. In detail, the plurality of processing elements 120-1 and 120-2 may perform a particular operation corresponding to a packet type of a request packet distributed to each of the plurality of processing elements 120-1 and 120-2. In addition, the plurality of processing elements 120-1 and 120-2 may generate a response packet including information with respect to a result of the operation performed.

In addition, each of the plurality of processing elements 120-1 and 120-2 may include a queue. Accordingly, when the plurality of request packets P1, P2, and P3 are distributed to each of the plurality of processing elements 120-1 and 120-2, each of the plurality of processing elements 120-1 and 120-2 may input the plurality of request packets P1, P2, and P3 to the queue and process the plurality of request packets P1, P2, and P3 according to the input order. In other words, the plurality of processing elements 120-1 and 120-2 may process the plurality of request packets P1, P2, and P3 distributed according to a FIFO method.

When a plurality of response packets P1', P2', and P3' are received from the plurality of processing elements 120-1 and 120-2, the aggregator 130 may aggregate the plurality of response packets P1', P2', and P3' according to a scheduling policy. In detail, when the plurality of response packets P1', P2', and P3' are received, the aggregator 130 may aggregate the plurality of response packets P1', P2', and P3' according to a scheduling policy determined for corresponding request packets.

For example, when request packets corresponding to the plurality of response packets P1', P2', and P3' are distributed according to the round robin policy, the aggregator 130 may aggregate the plurality of response packets P1', P2', and P3' according to the round robin policy. Example embodiments of aggregating response packets according to the above-stated scheduling policy will be described below with reference to FIGS. 5 to 7B.

In addition, the aggregator 130 may further consider whether ordering is required to aggregate the plurality of response packets P1', P2', and P3'. In detail, the aggregator 130 may further check whether ordering is required based on a packet type of the plurality of response packets P1', P2', and P3' and, when the aggregator 130 determines that ordering is required, aggregate and output the plurality of response packets P1', P2', and P3' according to an order in which request packets are distributed by referring to the order information generated by the distributer 110. A detailed description with respect to the above example embodiment will be described below with reference to FIGS. 8 and 9.

In addition, the aggregator 130 may output, to the outside of the IP 100, the plurality of response packets P1', P2', and P3', which are aggregated.

Although the plurality of processing elements are illustrated and described as two in FIG. 1, three or more processing elements may be included in an implementation.

In addition, although the plurality of request packets and the plurality of response packets are illustrated and described as three in FIG. 1, two or more packets may be included in an implementation.

As described above, since the IC device according to an example embodiment of the inventive concepts processes a plurality of packets by using a plurality of processing elements instead of one processing element, the performance of an IP of the IC device may be improved.

In addition, since the IC device may apply a method of increasing the processing performance for each packet type by distributing packets according to a scheduling policy determined based on the packet type, rather than distributing the packets in a consistent method, the performance of the IP may be improved.

In addition, since the IC device includes a distributer and an aggregator, the IC device may operate, in the outside, the same as in a case where packets are input/output to/from an IC device having one processing element. Therefore, even when an external structure of the IC device is not changed, the performance of the IC device may be improved by using the plurality of processing elements.

FIG. 2 is a diagram illustrating an example embodiment of packet aggregation information according to an example embodiment of the inventive concepts.

Referring to FIGS. 1 and 2, the packet aggregation information may include a packet-type value of a packet pair, command information, scheduling policy information, and ordering information. The distributer 110 may generate the packet aggregation information with respect to a plurality of request packets while distributing the plurality of request packets. Since the distributer 110 determines, based on a packet type, a scheduling policy and whether ordering is required, the distributer 110 may generate the packet aggregation information for each packet type.

The packet-type value of a packet pair may include a value of a packet type included in a header of a request packet and a value of a packet value expected to have a response packet. For example, when the packet type value of the request packet is 0×4 and the corresponding value indicates a read command, the response packet may be expected to be a value of a packet type of 0×40 indicating read completion corresponding to the request packet. Accordingly, packet-type information of a packet pair may include '0×4', which is a packet-type value of the request packet, and '0×40', which is an expected packet-type value of the response packet. The value 0×4 of the read command or the value 0×40 of the read completion is just an example embodiment, and different values may be included.

The command information indicates information with respect to a command type corresponding to the above-stated packet-type value of a packet pair. In the above embodiment, since the packet-type value of the request packet is 0×4 and the corresponding value indicates a read command, the command information of the packet aggregation information may include 'read'. In another example embodiment, since the packet-type value of the request packet is 0×3 and the corresponding value indicates a write command, the command information of the packet aggregation information may include 'write'.

The scheduling policy information indicates information with respect to a scheduling policy determined by the distributer 110 based on the packet type of the request packet. For example, when the packet type of the request packet is a read command, the distributer 110 may generate the modular policy or the round robin policy as the scheduling policy information.

The ordering information indicates information on whether a plurality of response packets corresponding to a plurality of request packets are required to be aggregated according to an order in which the plurality of request packets are distributed. The distributer 110 may determine whether ordering is required according to the packet type of the plurality of request packets and generate ordering information based on the determination. For example, when the packet type of the request packet is a write command (packet-type value: '0×3'), the distributer 110 may generate ordering information ('Yes') indicating that ordering is performed. In addition, when the distributer 110 determines to perform ordering, the distributer 110 may generate order information of the plurality of request packets.

The distributer 110 may share the generated packet aggregation information with the aggregator 130. For example, the distributer 110 may copy the generated packet aggregation information and transmit the packet aggregation information to the aggregator 130, or the generated packet aggregation information may be stored in a separate buffer (not shown) accessible by both of the distributer 110 and the aggregator 130. Example embodiments of the inventive concepts is not limited thereto, and the packet aggregation information may be shared in various methods.

The aggregator 130 may aggregate the plurality of response packets based on the packet aggregation information. In detail, the aggregator 130 may check a header of the plurality of response packets to check the packet-type value and check the scheduling policy information and the ordering information corresponding to the packet-type value identified from the packet aggregation information. In addition, the aggregator 130 may aggregate the plurality of response packets according to the checked result of the scheduling policy and whether ordering is required. For example, the aggregator 130 may confirm the packet-type value (0×30) of the response packet and confirm the scheduling policy information (modular) and the ordering information (Yes) corresponding to the packet-type value (0×30) from the packet aggregation information.

According to an example embodiment, the aggregator 130 may decide a command corresponding to a packet type included in a header of the plurality of response packets and check, from the packet aggregation information, the scheduling policy information and the ordering information corresponding to the command decided. In addition, the aggregator 130 may aggregate the plurality of response packets according to the checked result of the scheduling policy and whether ordering is required. For example, when the packet type of the response packet is read completion, the aggregator 130 may confirm, from the packet aggregation information, the scheduling policy information (round robin) and the ordering information (No) of the corresponding command (that is, a read command).

As described above, the aggregator 130 may check the packet-type value of a packet pair of the response packet or a corresponding command and check the scheduling policy and the ordering information corresponding to the packet value or the command identified from the packet aggregation information.

Although packet aggregation information is illustrated and described as including both of the packet-type value of a packet pair and the command information in FIG. 2, the packet aggregation information may include only one of the packet-type value of a packet pair and the command information in an implementation. In detail, the distributer may generate packet aggregation information including only one of the packet-type value of a packet pair and the command information, and the aggregator may determine the scheduling policy or whether ordering is required based on the packet-type value included in the packet aggregation information or may determine the scheduling policy or whether ordering is required based on the command information included in the packet aggregation information.

In addition, the packet aggregation information is illustrated and described as including both of the scheduling policy information and the ordering information in FIG. 2, in an implementation, only one piece of information may be included in the packet aggregation information, or the scheduling policy information and the ordering information may be separately generated.

In addition, although it is shown and described with reference to FIG. 2 that the scheduling policy is determined to be the round robin policy when the packet type is a read command and the scheduling policy is determined to be the modular policy when the packet type is a write command, the inventive concepts is not limited thereto. According to an example embodiment of the inventive concepts, the IP may be implemented as that the scheduling policy is determined to be the modular policy when the packet type is a read command and the scheduling policy is determined to be the round robin policy when the packet type is a write command, and the scheduling policies corresponding to each of the read command and the write command may be determined to be the same. Hereinafter, a case in which the scheduling policies corresponding to each of the read command and the write command according to an example embodiment of the inventive concepts are determined to be the same will be described below.

FIG. 3 is a diagram illustrating an example embodiment of packet aggregation information according to an example embodiment of the inventive concepts.

Referring to FIG. 3, both of the scheduling policies corresponding to each of the read command and the write command are confirmed as the same modular policy in the packet aggregation information. The distributer 110 may check the packet type included in the header of the plurality of request packets and determine the scheduling policy for the request packets whose packet types are a read command or a write command to be the modular policy to generate the packet aggregation information including the packet-type value of a packet pair or the command information.

In addition, since the distributer 110 may independently determine whether ordering is required based on the packet type, the distributer 110 may determine that ordering is performed for the request packet which is a write command and ordering is not performed for the request packet which is a read command to generate the packet aggregation information including the ordering information. In addition, when the distributer 110 determines to perform ordering, the distributer 110 may generate order information of the plurality of request packets.

Although the scheduling policies corresponding to each of the read command and the write commend are illustrated and described the same as the modular policy in FIG. 3, the scheduling policies may be determined to be the same as the broadcast policy or the same as the round robin policy.

In addition, although it is shown and described with reference to FIG. 3 that ordering is not performed when a packet corresponds to a read command and ordering is performed when a packet corresponds to a write command, the inventive concepts is not limited thereto. According to an example embodiment of the inventive concepts, the IP may be implemented as that ordering is performed when a packet corresponds to a read command and ordering is not performed when a packet corresponds to a write command.

Figure 4:
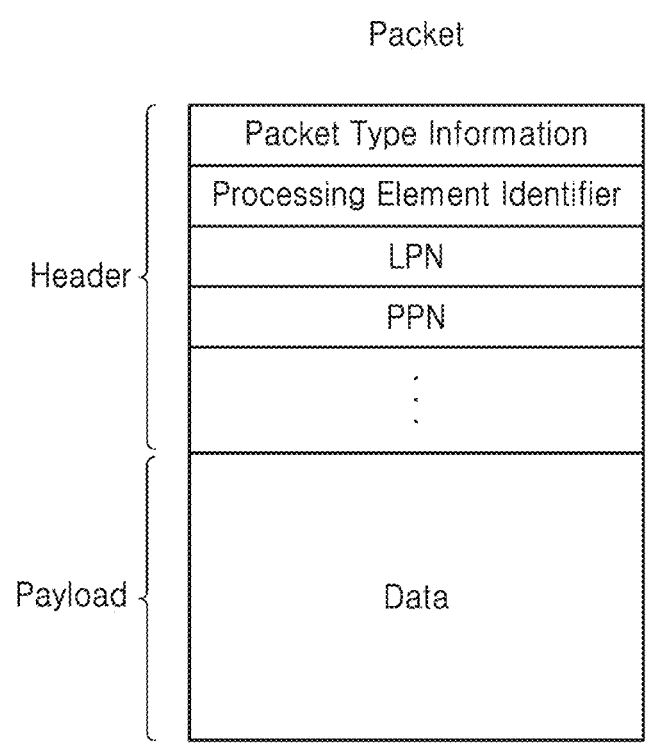
FIG. 4 is a diagram illustrating an example embodiment of a packet structure according to an example embodiment of the inventive concepts.

FIG. 4 is a diagram illustrating an example of a packet structure according to an example embodiment of the inventive concepts.

Referring to FIG. 4, a packet may include a header and a payload.

For example, the header may include packet-type information, logical page number (LPN) information, physical page number (PPN) information, or the like, and the payload may include data.

The packet type may include information indicating that a request packet is a packet requesting a command such as a read command, a write command, an erase command, a trim command, or the like, and may include information indicating that a response packet is a packet indicating read completion, write completion, erase completion, or trim completion, or the like.

The LPN information is logical address information of data related to the packet type, and the PPN information is physical address information corresponding to the LPN.

According to an example embodiment, a processing element identifier PE ID may be further included in the header. For example, in a header of a request packet, the processing element identifier PE ID to process the request packet may be included. In another example embodiment, in a header of a response packet, the processing element identifier PE ID that generated the response packet may be included.

The aggregator 130 may use processing element identifier PE ID information included in the header of the response packet to determine which processing element generated the response packet. In addition, the aggregator 130 may use the processing element identifier PE ID information to aggregate a plurality of response packets.

For example, when ordering of the plurality of response packets are required, the aggregator 130 may check the processing element identifier PE ID information included in the header of the plurality of response packets and use order information recording processing element identifiers PE ID of the plurality of the process elements receiving the plurality of request packets according to a distribution order of the plurality of request packets to perform ordering on the plurality of response packets. A detailed description with respect to ordering will be described below with reference to FIGS. 8 and 9.

Figure 5:
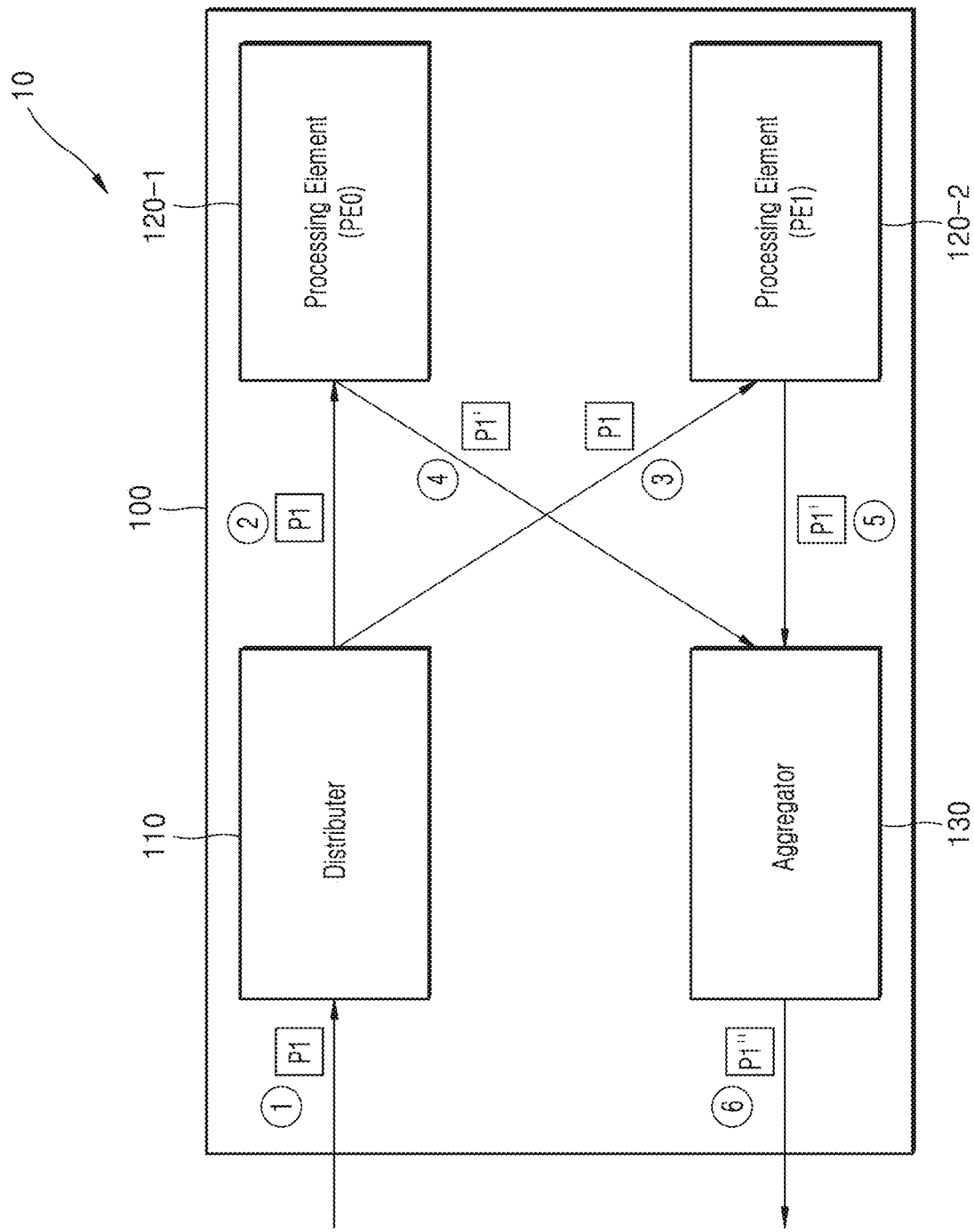
FIG. 5 is a diagram illustrating an example embodiment of a broadcast policy according to an example embodiment of the inventive concepts.

FIG. 5 is a diagram illustrating an example embodiment of a broadcast policy according to an example embodiment of the inventive concepts.

Referring to FIGS. 1 to 5, when a request packet P1 is input, the distributer 110 may check packet-type information included in a header of the request packet P1 and determine a scheduling policy corresponding to the checked packet-type information (①).

For example, the distributer 110 may checked that a packet type of the request packet P1 is an erase command or a trim command and determine the broadcast policy as the corresponding scheduling policy.

In addition, the distributer 110 may generate packet aggregation information with respect to the request packet P1 and copy the request packet P1 to distribute to all of the plurality of processing elements 120-1 and 120-2 (②, ③).

In addition, the plurality of processing elements 120-1 and 120-2 may perform a particular operation based on the request packet P1 distributed to each of the plurality of processing elements 120-1 and 120-2. For example, the plurality of processing elements 120-1 and 120-2 may check that the packet type of the request packet P1 is an erase command or a trim command and perform an operation corresponding to the command.

When the plurality of processing elements 120-1 and 120-2 check that the packet type of the request packet P1 is an erase command or a trim command, the plurality of processing elements 120-1 and 120-2 may perform an erase operation or a trim operation on a data area allocated to each of the plurality of processing elements 120-1 and 120-2.

For example, the plurality of processing elements 120-1 and 120-2 may perform the erase operation or the trim operation on a memory (not shown) having 0 to 99 blocks. Data of 0 to 49 blocks may be allocated to the first processing element 120-1, and data of 50 to 99 blocks may be allocated to the second processing element 120-2. When a request packet having a packet type of an erase command or a trim command is distributed, the first processing element 120-1 may perform the erase operation or the trim operation on the allocated data of 0 to 49 blocks, and the second processing element 120-2 may perform the erase operation or the trim operation on the allocated data of 50 to 99 blocks. When LPN or PPN information included in a header of the distributed request packet does not correspond to an address of each allocated data, the plurality of processing elements 120-1 and 120-2 may not perform the erase operation or the trim operation.

Each of the plurality of processing elements 120-1 and 120-2 may generate a response packet P1' corresponding to the request packet P1 and transmit the response packet P1' to the aggregator 130 (④, ⑤). For example, each of the plurality of processing elements 120-1 and 120-2 may perform the erase operation or the trim operation and generate a response packet having a packet type of erase completion or trim completion to transmit the response packet to the aggregator 130.

The aggregator 130 may check the packet type included in a header of a plurality of response packets P1' and aggregate the plurality of response packets P1' according to a scheduling policy corresponding to the checked packet type.

For example, the aggregator 130 may check that the packet type of the plurality of response packets P1' is erase completion or trim completion and check packet aggregation information to aggregate the plurality of response packets P1' according to the broadcast policy, which is a scheduling policy corresponding to the packet type.

When the scheduling policy is the broadcast policy, the aggregator 130 may check whether the response packets corresponding to each of the request packets have been received as many as the plurality of processing elements 120-1, 120-2. For example, referring to FIG. 5, as the plurality of processing elements 120-1 and 120-2 are two processing elements, the aggregator 130 may check whether two response packets P1' are received from the plurality of processing elements 120-1 and 120-2.

In addition, when the aggregator 130 confirms that the plurality of response packets P1' corresponding to the request packet P1 are received by the number of the plurality of processing elements 120-1 and 120-2, the aggregator 130 may generate and output a final response packet P1" (⑥). Since the response packet received from one processing element indicates only process completion with respect to data allocated to the corresponding processing element, receiving the response packets from all of the plurality of processing elements 120-1 and 120-2 is to confirm the process completion with respect to all data in the memory (not shown).

Figure 6:
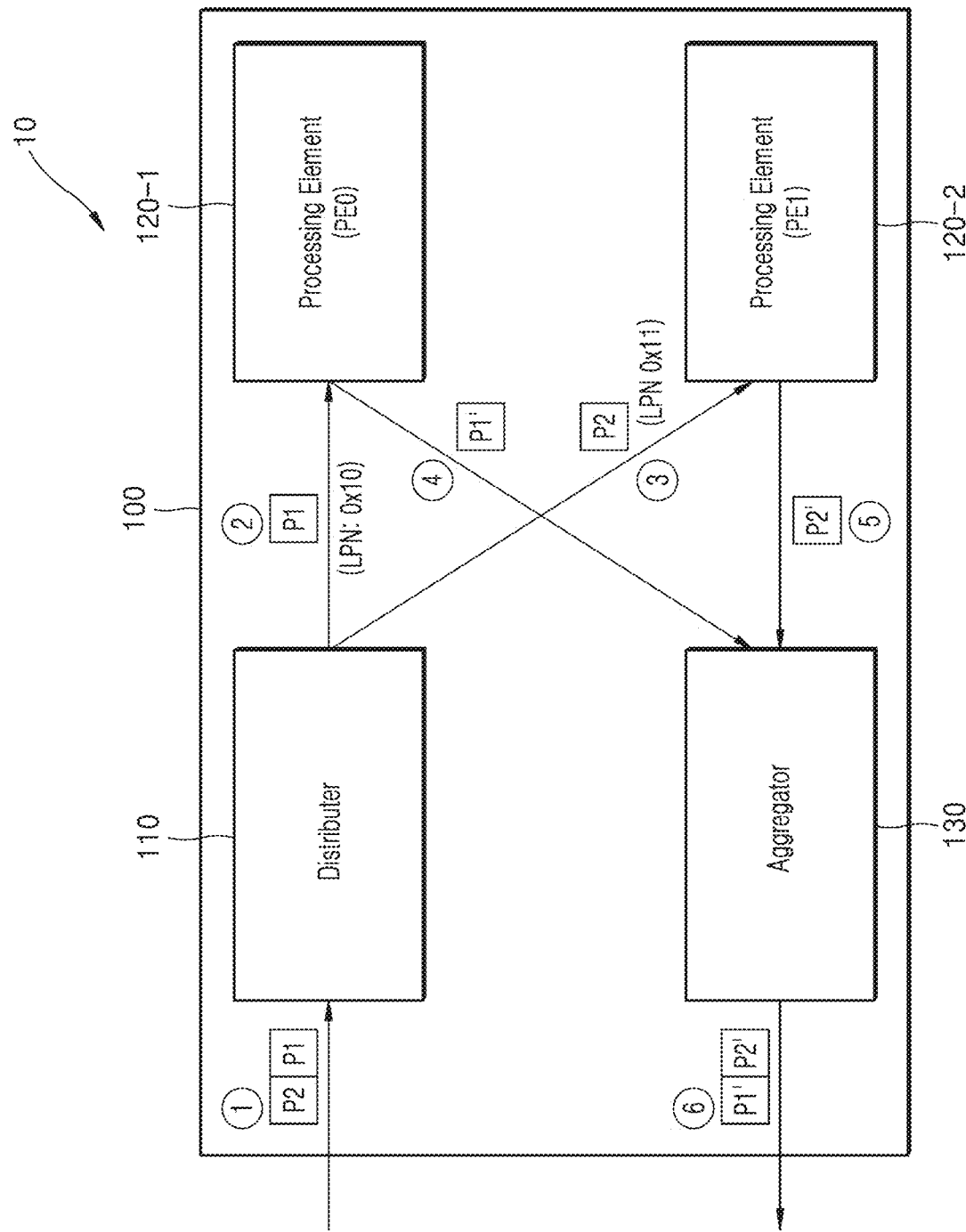
FIG. 6 is a diagram illustrating an example embodiment of a modular policy according to an example embodiment of the inventive concepts.

FIG. 6 is a diagram illustrating an example of a modular policy according to an example embodiment of the inventive concepts.

Referring to FIGS. 1 to 4 and 6, when a plurality of request packets P1 and P2 are input, the distributer 110 may check that a packet type included in headers of the plurality of request packets P1 and P2 is a read command or a write command and determine a corresponding scheduling policy to be a modular policy (①).

In addition, the distributer 110 may check, with respect to each of the plurality of request packets P1 and P2, a value described in a preset field (for example, LPN or Cache ID information) of the headers. In addition, the distributer 110 may apply a remainder arithmetic using the number of processing elements, that is, the plurality of processing elements 120-1 and 120-2, to the checked value and determine a processing element corresponding to the application result as a processing element to distribute the corresponding request packet. In addition, the distributer 110 may generate packet aggregation information and distribute each request packet to the determined processing element.

For example, referring to FIG. 6, the distributer 110 may confirm an LPN value 0×10 in the header of the request packet P1 and apply a remainder arithmetic using 2 to the confirmed value, and distribute the request packet P1 to the first processing element 120-1 corresponding to the application result 0 (②). In addition, the distributer 110 may confirm an LPN value 0×11 in the header of the request packet P2 and apply the remainder arithmetic using 2 to the confirmed value, and distribute the request packet P2 to the second processing element 120-2 corresponding to the application result 1 (③).

In addition, the plurality of processing elements 120-1 and 120-2 may perform a particular operation based on the request packets P1 and P2 respectively distributed to the plurality of processing elements 120-1 and 120-2. For example, the plurality of processing elements 120-1 and 120-2 may check that a packet type of the request packets P1 and P2 is a read command or a write command and perform an operation corresponding to the command.

In addition, the plurality of processing elements 120-1 and 120-2 may respectively generate a plurality of response packets P1' and P2' corresponding to the plurality of request packets P1 and P2 and transmit the plurality of response packets P1' and P2' to the aggregator 130 (④, ⑤). For example, each of the plurality of processing elements 120-1 and 120-2 may generate a response packet having a packet type of read completion or write completion and transmit the response packet to the aggregator 130.

The aggregator 130 may check packet-type information included in headers of the plurality of response packets P1' and P2' and aggregate the plurality of response packets P1' and P2' according to a scheduling policy corresponding to the checked packet-type information.

For example, the aggregator 130 may check that a packet type of the plurality of response packets P1' and P2' is read completion or write completion and check the packet aggregation information to aggregate the plurality of response packets P1' and P2' according to a modular policy, which is the scheduling policy corresponding to the packet aggregation information.

When the scheduling policy is the modular policy, the aggregator 130 may aggregate and output the plurality of response packets P1' and P2' without performing a particular operation (⑥). Accordingly, when a response packet is received from a processing element, the aggregator 130 may immediately output the corresponding response packet.

The aggregator 130 may check the packet aggregation information to further check whether ordering with respect to the plurality of response packets P1' and P2' is required. When the aggregator 130 determines that ordering is not required, the aggregator 130 may output the plurality of response packets P1' and P2' without ordering. On the other hand, when the aggregator 130 determines that ordering is required, the aggregator 130 may use order information to perform ordering on the plurality of response packets P1' and P2'. A detailed description with respect to ordering will be described below with reference to FIGS. 8 and 9.

Although the preset field of the header of the request packet is illustrated and described as a field corresponding to the LPN information in FIG. 6, other information included in the header may be set as the preset field in an implementation.

Figure 7A:
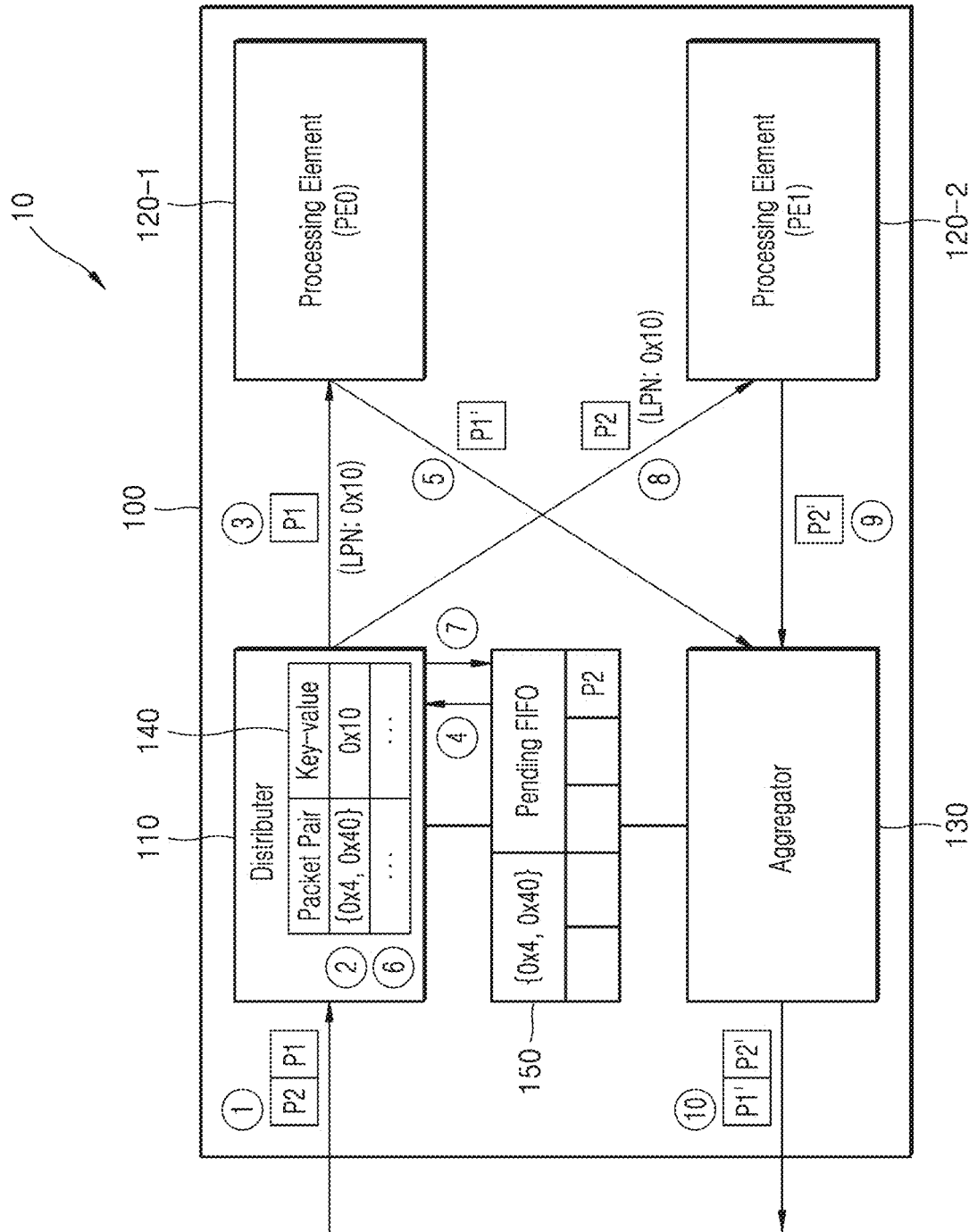
FIGS. 7A and 7B are diagrams illustrating examples of a round robin policy according to example embodiments of the inventive concepts.
Figure 7B:
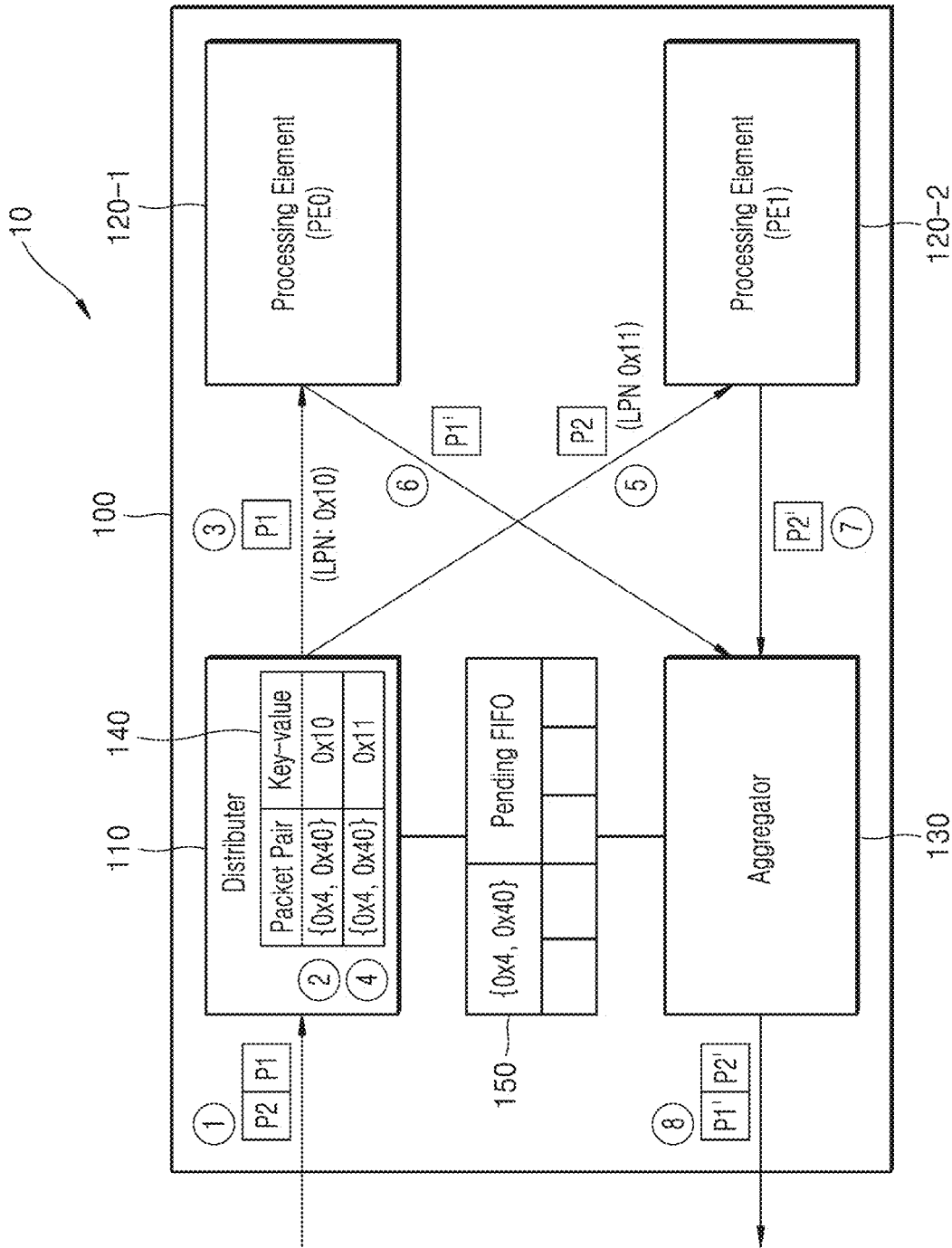

FIGS. 7A and 7B are diagrams illustrating embodiments of a round robin policy according to example embodiments of the inventive concepts.

Referring to FIGS. 1 to 4 and 7A, when the plurality of request packets P1 and P2 are input, the distributer 110 may check that the packet type included in the headers is a read command or a write command and determine a corresponding scheduling policy to be a round robin policy (①).

In addition, the distributer 110 may store, in a blocking table 140, a packet type of the request packet P1, a packet type of an expected response packet, and a value described in a preset field (for example, LPN or Cache ID information) in the header (②). The above value described in the preset field in the header may be referred to as a key-value.

Herein, the blocking table 140 is a table that the distributer 110 refers to such that two or more request packets having the same value described in the preset field of the header are not respectively distributed to different processing elements. The blocking table 140 is to prevent an error that may occur when two or more request packets having the same LPN Cache ID, or the like are respectively processed by different processing elements in a process of performing an operation such as a write command.

For example, referring to FIG. 7A, the distributer 110 may store, in the blocking table 140, a packet type 0×4 of the request packet P1, a packet type 0×40 of an expected response packet, and a value 0×10 of the LPN information.

In addition, the distributer 110 may generate packet aggregation information and distribute the request packet P1 to the first processing element 120-1 (③).

In addition, the distributer 110 may check whether a value described in a preset field of the header of the request packet P2 is stored in the blocking table 140. For example, referring to FIG. 7A, a packet type 0×4 of the request packet and a value 0×10 of the LPN information are stored in the blocking table 140.

In this case, the distributer 110 may input the request packet P2 into a pending FIFO 150 (④). Herein, the pending FIFO 150 is a queue for pending a request packet to be distributed, if one of the plurality of processing elements is processing for a different request packet having the same value as the value described in the preset field of the header of the request packet to be distributed, until the processing for the different request packet is complete.

In addition, the first processing element 120-1 may perform a particular operation based on the request packet P1. For example, the first processing element 120-1 may check that the packet type of the request packet P1 is a read command or a write command and perform an operation corresponding to the command.

In addition, the first processing element 120-1 may generate the response packet P1' corresponding to the request packet P1 and transmit the response packet P1' to the aggregator 130 (⑤).

In addition, the aggregator 130 may check packet-type information included in the header of the received response packet P1' and aggregate the response packet P1' according to a scheduling policy corresponding to the checked packet-type information.

For example, the aggregator 130 may check that the packet type of the response packet P1' is read completion or write completion and check the packet aggregation information to aggregate the response packet P1' according to the round robin policy, which is the scheduling policy corresponding to the packet aggregation information.

When the scheduling policy is the round robin policy, the aggregator 130 may check the packet type of the received response packet and the value described in the preset field of the header and access the blocking table 140 to delete information of the corresponding packet type and the corresponding value described in the preset field which are stored in the blocking table 140 (⑥).

For example, referring to FIG. 7A, the aggregator 130 may delete, from the blocking table 140, the packet type 0×40 of the response packet P1' and the LPN information 0×10.

In addition, the aggregator 130 may check the pending FIFO 150 to check whether there is a request packet being pending. When the request packet, which is pending, is identified, the aggregator 130 may request the distributer 110 to distribute the packet. In addition, the aggregator 130 may output the response packet P1'.

The distributer 110 may check again, according to the packet distribution request from the aggregator 130, whether the packet type of the request packet P2, which is pending in the pending FIFO 150, and the value described in the preset field are stored in the blocking table 140.

When the distributer 110 identifies that the packet type of the request packet P2, which is pending, and the value described in the preset field are not stored in the blocking table 140, the distributer 110 may output the request packet P2, which is pending, from the pending FIFO 150 (⑦).

In addition, the distributer 110 may store, in the blocking table 140, the packet type of the request packet P2, the packet type of an expected response packet, and the value described in the preset field and distribute the second request packet P2 to the second processing element 120-2 (⑧).

In addition, the second processing element 120-2 may perform a particular operation based on the request packet P2. In addition, the second processing element 120-2 may generate the response packet P2' corresponding to the request packet P2 and transmit the response packet P2' to the aggregator 130 (⑨).

The aggregator 130 may check the packet type and the value described in the preset field of the header of the received response packet P2' and access the blocking table to delete information of the corresponding packet type and the corresponding value described in the preset field, which are stored in the blocking table 140. In addition, the aggregator 130 may check whether there is a pending packet, which corresponds to the packet type of the response packet P2', in the pending FIFO 150.

In addition, the aggregator 130 may output the response packet P2' (⑩).

Values described in a preset field of a plurality of request packets may be different from each other. In this case, a detailed description with respect to an operation of the IP 100 will be described below with reference to FIG. 7B.

Referring to FIGS. 1 to 4 and 7B, when the plurality of request packets P1 and P2 are input, the distributer 110 may check that a packet type included in the headers is a read command or a write command and determine a corresponding scheduling policy to be the round robin policy (①).

In addition, the distributer 110 may store, in the blocking table 140, a packet type 0×4 of the request packet P1, a packet type 0×40 of an expected response packet, and LPN information 0×10 (②). In addition, the distributer 110 may generate packet aggregation information and distribute the request packet P1 to the first processing element 120-1 (③).

In addition, the distributer 110 may confirm that LPN information 0×11 of the request packet P2 is not stored in the blocking table 140. Accordingly, the distributer 110 may store, in the blocking table 140, a packet type 0×4 of the request packet P2, a packet type 0×40 of an expected response packet, and LPN information 0×11 (④) and distribute the request packet P2 to the second processing element 120-2 (⑤).

In addition, the plurality of processing elements 120-1 and 120-2 may perform a particular operation based on the request packets P1 and P2 respectively distributed to the plurality of processing elements 120-1 and 120-2. In addition, the plurality of processing elements 120-1 and 120-2 may respectively generate the plurality of response packets P1' and P2' corresponding to the plurality of request packets P1 and P2 and transmit the plurality of response packets P1' and P2' to the aggregator 130 (⑥, ⑦).

The aggregator 130 may check the packet type included in the headers of the plurality of response packets P1' and P2' and aggregate the plurality of response packets P1' and P2' according to the round robin policy, which is the scheduling policy corresponding to the checked packet type.

In detail, the aggregator 130 may check the packet type and the value described in the preset field of the header of each response packet and access the blocking table 140 to delete the information of the corresponding packet type and the corresponding value described in the preset field, which are stored in the blocking table 140.

In addition, the aggregator 130 may check whether there is a pending request packet, which corresponds to the packet type of the response packet, in the pending FIFO 150. In addition, the aggregator 130 may output the plurality of response packets P1' and P2' (⑧).

Although it is shown and described with reference to FIGS. 7A and 7B that the distributer 110 includes the blocking table 140, the IP 100 may be implemented as that the distributer 110 copies the blocking table 140 and transmits the blocking table 140 to the aggregator 130, or that the blocking table 140 may be stored in a separate buffer (not shown) which both of the distributer 110 and the aggregator 130 may access. Example embodiments of the inventive concepts is not limited thereto, and the blocking table 140 may be shared in various methods.

In addition, it is illustrated and described with reference to FIGS. 7A and 7B that the pending FIFO 150 is included in the IP 100, the pending FIFO 150 may be a structure outside the IP 100 in an implementation.

The aggregator 130 may check the packet aggregation information to further check whether ordering with respect to the plurality of response packets P1' and P2' is required.

When the aggregator 130 determines that ordering is not required, the aggregator 130 may output the plurality of response packets P1' and P2' without ordering. On the other hand, when the aggregator 130 determines that ordering is required, the aggregator 130 may use order information to perform ordering on the plurality of response packets P1' and P2'. A detailed description with respect to ordering will be described below with reference to FIGS. 8 and 9.

Figure 8:
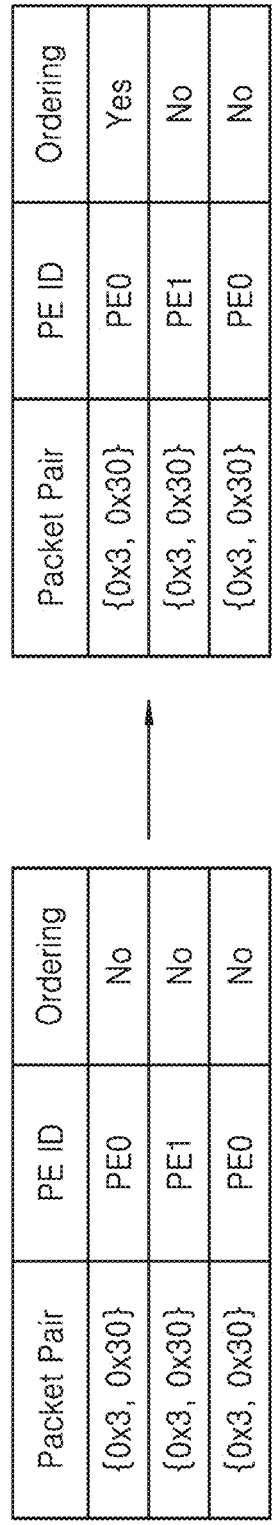
FIG. 8 is a diagram illustrating an example of order information according to an example embodiment of the inventive concepts.

FIG. 8 is a diagram illustrating an example embodiment of order information according to an example embodiment of the inventive concepts.

Referring to FIGS. 1 to 4, and 8, the ordering information may include packet-type information of a packet pair, a processing element identifier PE ID, and ordering.

The distributer 110 may determine whether ordering is required based on the packet type of the plurality of request packets and, when the distributer 110 determines that ordering is required, generate order information while distributing the plurality of request packets to the plurality of processing elements 120-1 and 120-2. In addition, the distributer 110 may share the generated order information with the aggregator 130. For example, the distributer 110 may copy the generated order information to transmit the order information to the aggregator 130, or the order information may be stored in a separate buffer (not shown) accessible by both of the distributer 110 and the aggregator 130. Example embodiments of the inventive concepts is not limited thereto, and the order information may be shared in various methods.

The packet-type information of a packet pair of the order information may include information of a packet type of a request packet and information of a packet type expected to have a response packet. For example, referring to FIG. 8, the order information may include the packet-type information of a packet pair including the packet type 0×3 of the request packet and the packet type 0×30 of the response packet.

The processing element identifier PE ID information of the order information is information sequentially recording the processing element identifiers PE ID receiving the plurality of request packets according to a distribution order of the plurality of request packets.

For example, referring to FIG. 8 when three request packets are distributed in an order of 'the first processing element 120-1—the second processing element 120-2—the first processing element 120-1', the order information may include the processing element identifier PE ID information recorded in an order of 'PE0-PE1-PE0'.

The ordering information indicates whether each of the response packets is ordered according to the order information. When ordering with respect to a particular packet is completed, the ordering information with respect to the particular packet in the order information may be changed.

For example, referring to FIG. 8, when ordering with respect to the response packet having a packet type 0×30 and a processing element identifier of PE0 is performed, the ordering information of the corresponding packet may be changed from No to Yes.

The order information may be implemented in a form of an ordering FIFO. In detail, ordering FIFO for each packet pair including the packet type of the plurality of request packets and the packet type of the corresponding response packets may be generated.

For example, referring to FIG. 8, an ordering FIFO for a packet pair including the packet type 0×30 of the request packet and the packet type 0×30 of the response packet may be generated.

The processing element identifiers PE ID receiving the plurality of request packets according to the distribution order of the plurality of request packets may be sequentially input to the ordering FIFO.

The aggregator 130 may order the plurality of response packets with reference to the order information or the ordering FIFO. A detailed description with respect to the above description will be given below with reference to FIG. 9.

Figure 9:
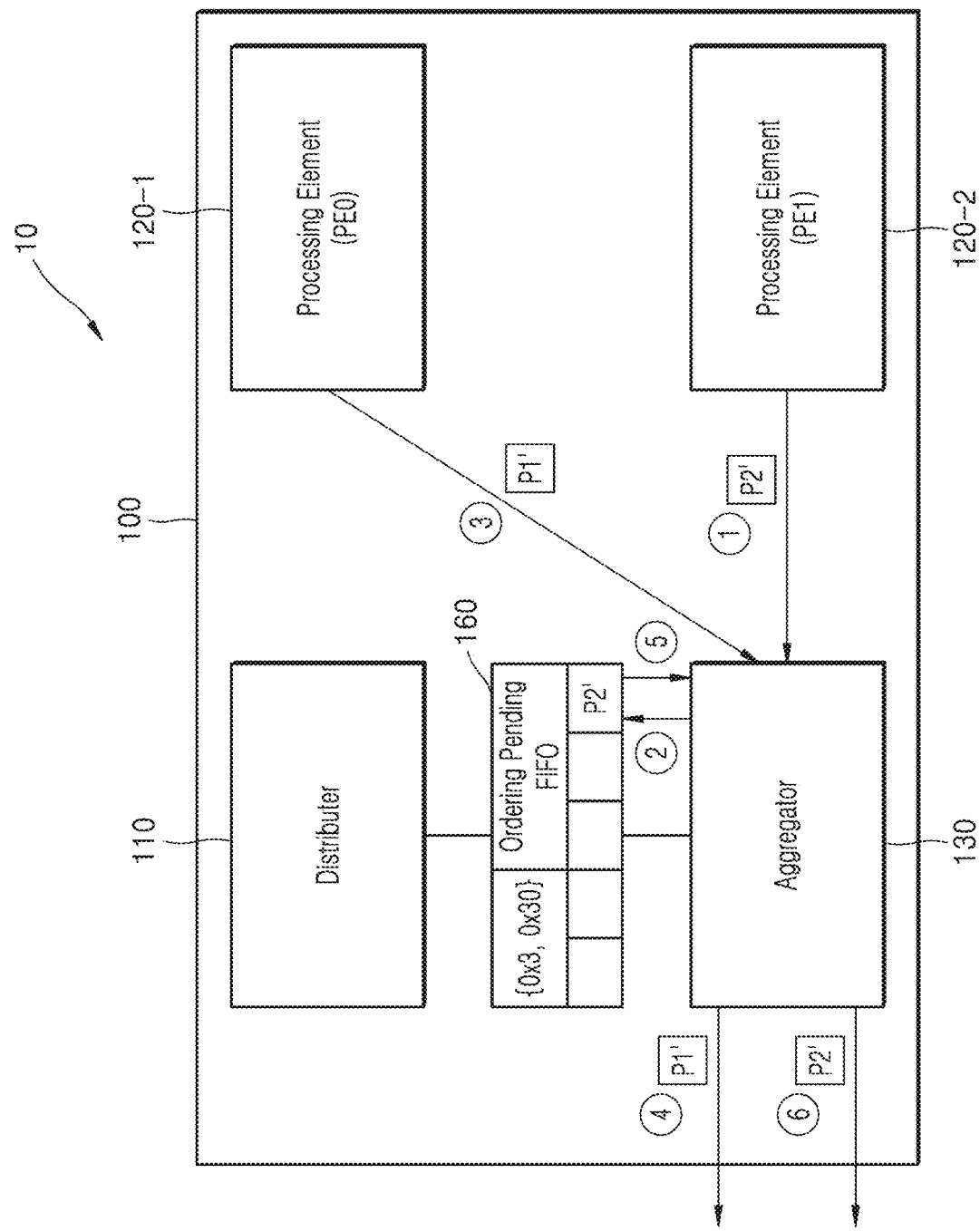
FIG. 9 is a diagram illustrating an example of ordering according to an example embodiment of the inventive concepts.

FIG. 9 is a diagram illustrating an example of ordering according to an example embodiment of the inventive concepts.

Referring to FIGS. 1 to 4, 8, and 9, the aggregator 130 may receive the response packet P2' from the second processing element 120-2 (①).

The aggregator 130 may check the packet aggregation information corresponding to the packet type of response packet to check whether ordering of the corresponding response packet is required. When it is confirmed that ordering is required, the aggregator 130 may check the processing element identifier PE ID information included in the header of the response packet. In addition, the aggregator 130 may check whether an output of the response packet matches the distribution order of the request packets by referring to the processing element identifier PE ID of the response packet and the order information.

In detail, the aggregator 130 may check whether the processing element identifier PE ID of the corresponding response packet is recorded in an earliest order in the order information, among the processing element identifiers PE ID in which the ordering is not performed.

When the processing element identifier PE ID of the response packet is recorded in the earliest order in the order information, it indicates that the outputting of the corresponding response packets to the outside matches the distribution order. Accordingly, the aggregator 130 may output the corresponding response packet to the outside and change, in the order information, the ordering information corresponding to the corresponding response packets from No to Yes.

On the other hand, when the processing element identifier PE ID of the corresponding response packet is not recorded in the earliest order in the order information, since a separate response packet is ahead of the corresponding response packet, it indicates that the outputting of the corresponding response packet to the outside does not match the distribution order. Accordingly, the aggregator 130 may determine the output of the corresponding response packet is pending and may not change the order information.

For example, referring to FIGS. 8 and 9, upon receiving the response packet P2' having the processing element identifier PE ID of PE1, the aggregator 130 may check that the PE1 is recorded in the second order among the processing element identifiers PE ID PE0, PE1, and PE0 on which ordering is not performed. Accordingly, the aggregator 130 may determine that the output of the response packet P2' is pending.

In addition, the aggregator 130 may input the response packet, which is determined to be pending, in an ordering pending FIFO 160. Herein, the ordering pending FIFO 160 is, when a particular response packet is received by the aggregator 130 but does not match the distribution order when the response packet is output, a queue for pending the corresponding response packet.

For example, referring to FIG. 9, the aggregator 130 may input the response packet P2', which is determined to be pending, into the ordering pending FIFO 160 (②).

In addition, the aggregator 130 may receive the response packet P1' from the first processing element 120-1 (③). In addition, the aggregator 130 may confirm that the processing element identifier PE ID of the response packet P1' is PE0 and refer to the order information in FIG. 8 to confirm that PE0, which is the processing element identifier PE ID of the response packet P1', is the earliest order among the processing element identifiers PE ID PE0, PE1, PE0, on which ordering is not performed.

Accordingly, the aggregator 130 may output the response packet P1' to the outside (④). In addition, the aggregator 130 may change an ordering item of PE0, which is the earliest order, in the order information in FIG. 8 to Yes.

In addition, the aggregator 130 may check, after performing the output, whether a response packet is in the ordering pending FIFO 160.

When there is a response packet in the ordering pending FIFO 160, the aggregator 130 may refer to the order information to determine whether outputting the response packet located at an output terminal of the ordering pending FIFO 160 to the outside matches the distribution order.

When the distribution order is matched, the aggregator 130 may take out, from the ordering pending FIFO 160, the response packet located at the output terminal of the ordering pending FIFO 160 and output the response packet to the outside. When the distribution order is not matched, the aggregator 130 may wait to receive the next response packet.

For example, referring to FIG. 9, the aggregator 130 may confirm that the processing element identifier PE ID of the response packet P2' is PE1 and refer to the order information in FIG. 8 to confirm that PE1, which is the processing element identifier PE ID of the response packet P2', is the earliest order among the processing element identifiers PE ID PE1, PE0, on which ordering is not performed. Accordingly, the aggregator 130 may take out the response packet P2' from the ordering pending FIFO 160 and output the response packet P2' to the outside. In addition, the aggregator 130 may change the ordering item of PE1 in the order information in FIG. 8 to Yes.

The aggregator 130 may repeat the above-stated operations until all of the ordering information in the order information is changed to Yes.

Although it is shown and described with reference to FIG. 9 that the aggregator 130 refers to the order information, the aggregator 130 may refer to the ordering FIFO, which is another form of the order information mentioned in FIG. 8 in an implementation.

In detail, the aggregator 130 may check whether a processing element identifier PE ID of a response packet is located at the output terminal of the ordering FIFO. When a response packet is located at the output terminal of the ordering FIFO), the aggregator 130 may output the corresponding response packet to the outside and output a processing element identifier PE ID of the response packet from the ordering FIFO. When a response packet is not located at the output terminal of the ordering FIFO, the aggregator 130 may pending the output of the corresponding response packet.

Although it is shown and described with reference to FIG. 9 that the ordering pending FIFO 160 is included in the IP 100, the ordering pending FIFO may be included outside the IP 100 in an implementation.

As described above, as the IC device according to an example embodiment of the inventive concepts may aggregate response packets by considering both of a scheduling policy and ordering according to a packet type, the performance of the IP may be improved.

Figure 10:
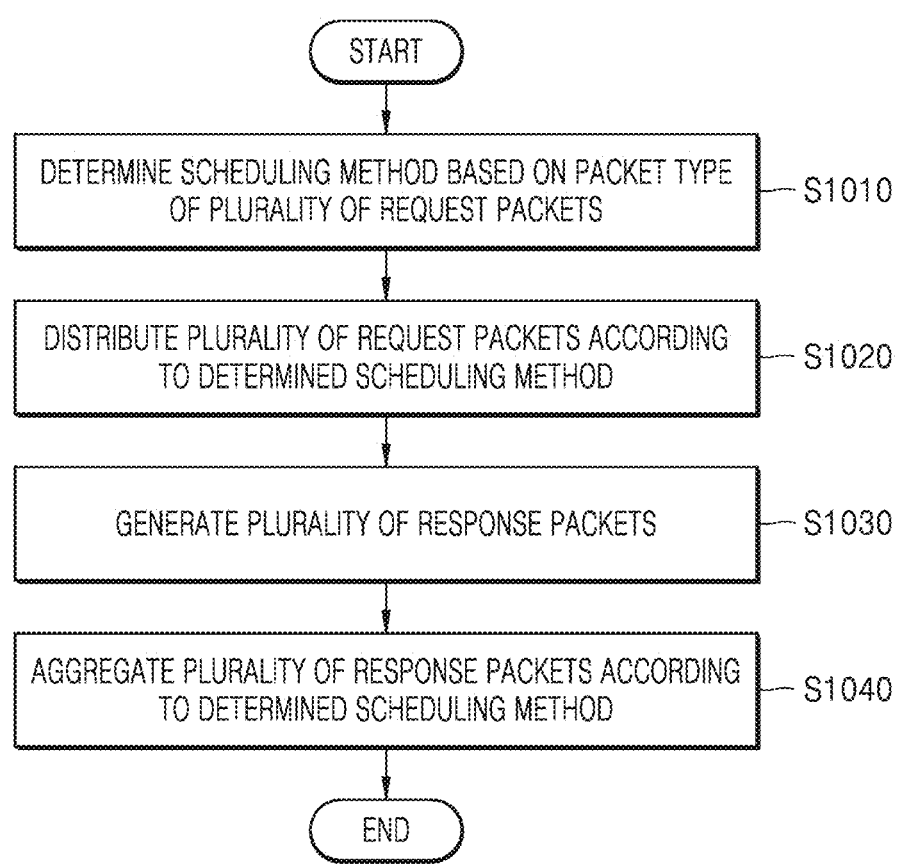
FIG. 10 is a flowchart illustrating a packet processing method according to an example embodiment of the inventive concepts.

FIG. 10 is a flowchart illustrating a packet processing method according to an example embodiment of the inventive concepts.

Referring to FIG. 10, the packet processing method according to the inventive concepts is a method performed by an IC device or a system-on-chip including the IP. For example, an operation method according to the inventive concepts may be performed in time series in the IC device in FIG. 1 or a system-on-chip including the IC device. The above descriptions with reference to FIGS. 1 to 9 may be applied to the present example embodiment.

First, in operation S1010, the distributer 110 may determine a scheduling policy based on a packet type of a plurality of request packets. In detail, packet-type information included in a header of each of the plurality of request packets may be checked, and a scheduling policy corresponding to the checked packet-type information may be determined.

Herein, the packet-type information indicates information indicating what command a packet requests when the packet type is a request packet, and indicates information indicating what type of response a packet makes when the packet type is a response packet.

The scheduling policy may include at least one of the broadcast policy, the modular policy, and the round robin policy, wherein the broadcast policy distributes each request packet to all of the plurality of processing elements, the modular policy distributes request packets to the plurality of processing elements based on a value obtained by applying a remainder arithmetic to a value of a preset field of a header of a request packet, and the round robin policy alternately distributes request packets to the plurality of processing elements.

When a command included in the request packet is an erase command or a trim command, the scheduling policy may be determined to be the broadcast policy. In addition, when the command included in the request packet is a read command or a write command, the scheduling policy may be determined to be the modular policy or the round robin policy. A method of determining the scheduling policy according to a command is not limited to the above embodiment.

Additionally, the distributer 110 may consider whether to perform ordering based on the packet type of the plurality of request packets. Herein, ordering indicates whether the plurality of response packets are required to be aggregated in an order in which the plurality of request packets are distributed.

For example, the distributer 110 may determine that, when the packet type of the plurality of request packets is a write command, ordering is performed and, when the packet type of the plurality of request packets is a read command, an erase command, or a trim command, ordering is not performed.

In S1020, the distributer 110 may distribute the plurality of request packets according to the determined scheduling policy.

In detail, when the scheduling policy is determined to be the broadcast policy, each request packet is copied and distributed to all of the plurality of processing elements.

When the scheduling policy is determined to be the modular policy, a value in the preset field (for example, LPN or Cache ID information) of the header may be checked for each of the plurality of request packets. In addition, a remainder arithmetic using a number of the plurality of processing elements may be applied to the checked value and a processing element corresponding to an application result may be determined as a processing element to distribute the corresponding request packet.

When the scheduling policy is determined to be the round robin policy, the plurality of request packets may be alternately distributed to the plurality of processing elements.

In addition, the distributer 110 may check a value described in the preset field of the header of each of the plurality of request packets. When there are two or more request packets having the same value described in the preset field of the header and one of the corresponding packets is distributed and being processed, the distribution of a remaining request packet may be pending. When the processing of the request packet being firstly processed is completed, the remaining request packet, which is pending, may be distributed.

When it is determined that ordering of the plurality of request packets is required, the distributer 110 may generate order information while distributing the plurality of request packets to the plurality of processing elements. Herein, the order information indicates information in which a processing element identifier PE ID, to which a plurality of request packets are distributed, is recorded according to a distribution order of the plurality of request packets.

In S1030, the processing elements 120 may generate a plurality of response packets. In detail, a particular operation corresponding to the packet type of the request packet is performed by using the plurality of processing elements, and a response packet including information with respect to a result of performing the operation may be generated.

When the packet type of the request packet is an erase command or a trim command, an erase operation or a trim operation with respect to a data area previously allocated to each of the plurality of processing elements may be performed through each of the plurality of processing elements.

In S1040, the aggregator 130 may aggregate the plurality of response packets according to the determined scheduling policy. In detail, when the plurality of response packets are received, the plurality of response packets are aggregated according to the scheduling policy determined with respect to the corresponding request packets.

When the scheduling policy is the broadcast policy, it may be determined whether the response packets are received, with respect to the plurality of request packets, in a number of the plurality of processing elements. When the reception of the response packets is confirmed, a final response packet may be generated and output to the outside.

In addition, the plurality of response packets may be aggregated by further considering whether ordering is required. In detail, the aggregator 130 may further check whether ordering is required based on a packet type of the plurality of response packets and, when it is determined that ordering is required, the plurality of response packets may be aggregated and output according to an order, in which the request packets are distributed by referring the generated order information.

Figure 11:
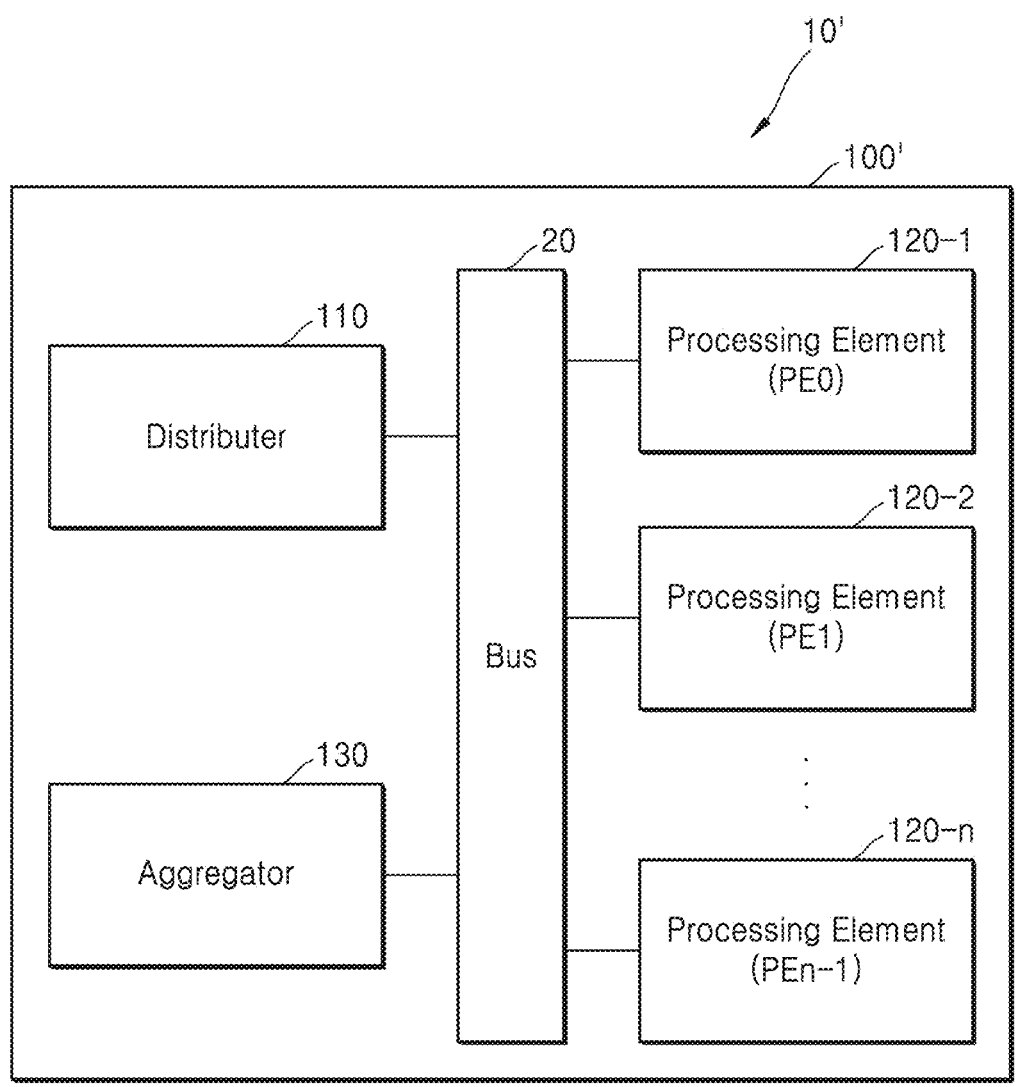
FIG. 11 is a block diagram illustrating an example of an integrated circuit device according to an example embodiment of the inventive concepts.

FIG. 11 is a block diagram illustrating an example embodiment of an IC device 10' according to an example embodiment of the inventive concepts.

Referring to FIG. 11, the IC device 10' may include an IP 100', and the IP 100' may include a distributer 110, n processing elements 120-1, 120-2, . . . , 120-n, wherein n is a natural number, an aggregator 130, and a bus 20. The IC device 10' is a modified embodiment of the IC device in FIG. 1.

As the distributer 110, the n processing elements 120-1, 120-2, . . . , 120-n, and the aggregator 130 of FIG. 11 may correspond to the distributer 110, the plurality of processing elements 120-1 and 120-2, and the aggregator 130 of FIG. 1, repeated descriptions are omitted.

The IP 100' is an example embodiment applicable to a case where many processing elements are included. Since a number of the processing elements increases, a direct connection relationship with the distributer 110 and the aggregator 130 becomes more complicated, the bus 20 may be used to simplify the connection relationship.

The bus 20 may transfer packets between the distributer 110 and the n processing elements 120-1, 120-2, . . . , 120-n. In addition, the bus 20 may transfer packets between the aggregator 130 and the n processing elements 120-1, 120-2, . . . , 120-n.

The bus 20 may be applied, as a standard, with an advanced microcontroller bus architecture (AMBA) protocol of an advanced RISC machine (ARM). A bus type of the AMBA protocol may include an advanced high-performance bus (AHB), an advanced peripheral bus (APB), an advanced eXtensible interface (AXI), AXI4, an AXI coherency extensions (ACE), or the like. In addition, other types of protocols, such as uNetwork of SONICs Inc., CoreConnect of IBM, open core protocol of OCP-IP, or the like, may be applied.

Figure 12:
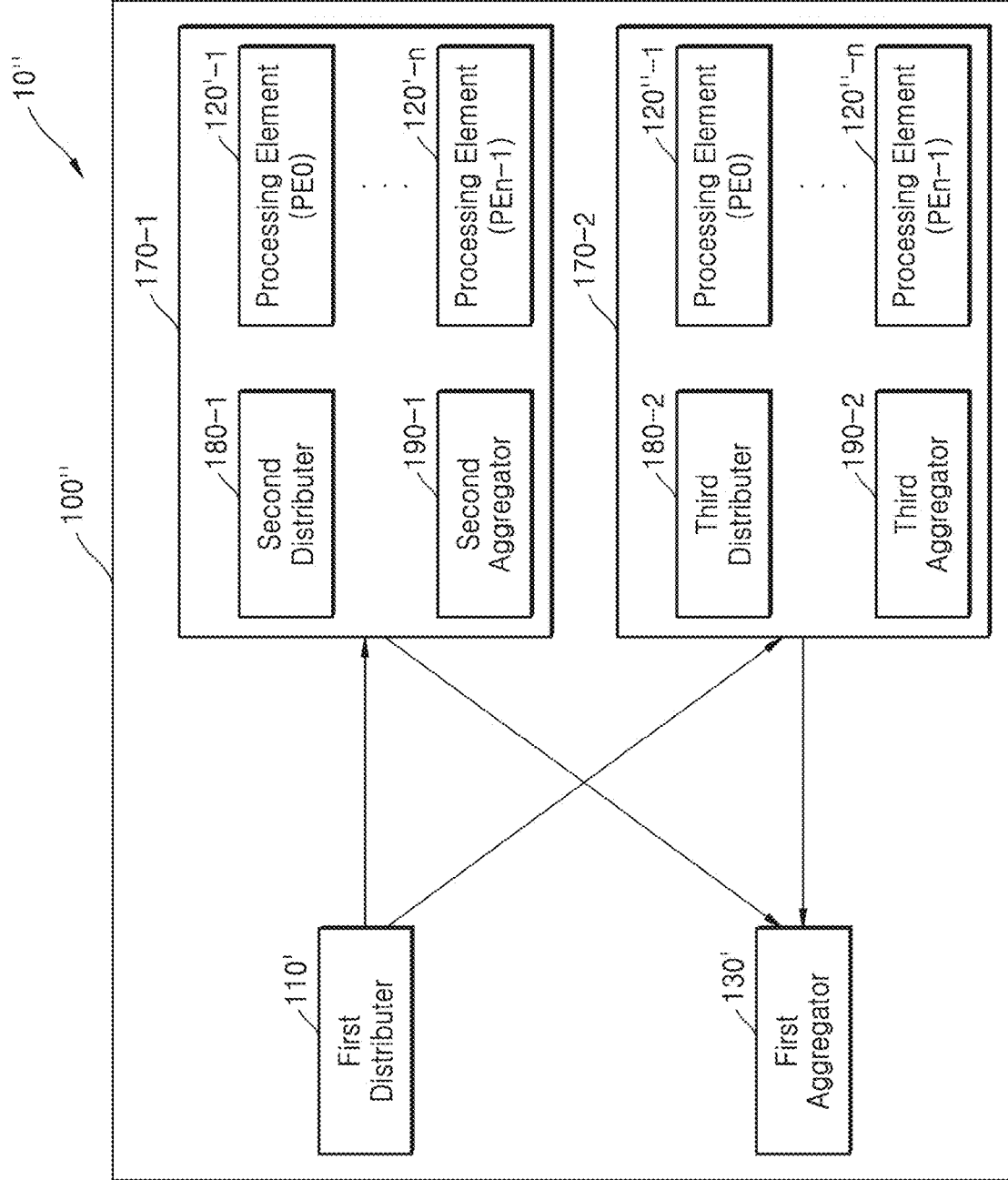
FIG. 12 is a block diagram illustrating an example of an integrated circuit device according to an example embodiment of the inventive concepts.

FIG. 12 is a block diagram illustrating an example embodiment of an IC device 10" according to an example embodiment of the inventive concepts.

Referring to FIG. 12, the IC device 10" may include an IP 100", and the IP 100" may include a first distributer 110', a first internal circuit 170-1, a second internal circuit 170-2, and a first aggregator 130'. The IC device 10" is a modified embodiment of the IC device 10 in FIG. 1.

The first distributer 110' may distribute input plurality of request packets to the first internal circuit 170-1 and the second internal circuit 170-2. The first distributer 110' may distribute, to the first internal circuit 170-1 and the second internal circuit 170-2, the input plurality of request packets in the same method of distributing the input plurality of request packets to the plurality of processing elements in FIG. 1.

In detail, the first distributer 110' may determine a scheduling policy based on a packet type of the plurality of request packets and distribute the plurality of request packets to the first internal circuit 170-1 and the second internal circuit 170-2 according to the determined scheduling policy.

When the scheduling policy is the broadcast policy, the first distributer 110' may distribute each request packet to both of the first internal circuit 170-1 and the second internal circuit 170-2.

When the scheduling policy is the modular policy, the first distributer 110' may distribute the plurality of request packets to both of the first internal circuit 170-1 and the second internal circuit 170-2 based on a value obtained by applying a remainder arithmetic to a value described in a preset field of a header of the request packet. The remainder arithmetic may be applied by using a number corresponding to a number of internal circuits.

When the scheduling policy is the round robin policy, the first distributer 110' may alternately distribute the request packets to the first internal circuit 170-1 and the second internal circuit 170-2. In addition, when there is two or more request packets having the same value described in the preset field of the header, the first distributer 110' may input a request packet that has not yet been distributed to a pending FIFO (not shown) such that the two or more request packets having the same value described in the preset field of the header are not distributed to different internal circuits. A method of distributing the plurality of request packets input by the first distributor 110' to the first internal circuit 170-1 and the second internal circuit 170-2 is not limited to the above-described example.

The first internal circuit 170-1 may include a second distributer 180-1, a second aggregator 190-1, and a plurality of processing elements 120'1-1, . . . , 120'-n. The second internal circuit 170-2 may include a third distributer 180-2, a third aggregator 190-2, and a plurality of processing elements 120"-1, . . . , 120"-n.

As operations of each structure in the first internal circuit 170-1 and the second internal circuit 170-2 correspond to the distributer 110, the plurality of processing elements 120-1 and 120-2, and the aggregator 130 in FIG. 1, repeated descriptions are omitted.

When a plurality of response packets are received from the first internal circuit 170-1 and the second internal circuit 170-2, the first aggregator 130' may aggregate the plurality of response packet according to a scheduling policy.

In detail, when the plurality of response packets are received, the first aggregator 130' may aggregate the plurality of response packets according to a scheduling policy determined with respect to the corresponding request packets.

When the scheduling policy is the broadcast policy, the first aggregator 130' may check whether each request packet is received in a number of internal circuits and, when the request packet is received in the number of internal circuits, generate a final response packet and output the final response packet.

When the scheduling policy is the modular policy, the first aggregator 130' may output the response packet received from the first internal circuit 170-1 and the second internal circuit 170-2.

When the scheduling policy is the round robin policy, the first aggregator 130' may output the response packet received from the first internal circuit 170-1 and the second internal circuit 170-2. In addition, the first aggregator 130' may check whether a request packet having the same value described in the preset field as the output response packet is pending in the pending FIFO (not shown) and, when the pending request packet is confirmed, request the first distributer 110' for packet distribution.

A method of aggregating the plurality of response packets received by the first aggregator 130' is not limited to the above-described example.

As described above, as the IC device according to an example embodiment of the inventive concepts may additionally introduce an aggregator and a distributer to distribute packets, a connection relationship between components may be simplified even in a case of having many processing elements. In addition, as it is possible to simplify the connection relationship with many processing elements without using a bus, a design area of the IC device may be reduced.

Figure 13:
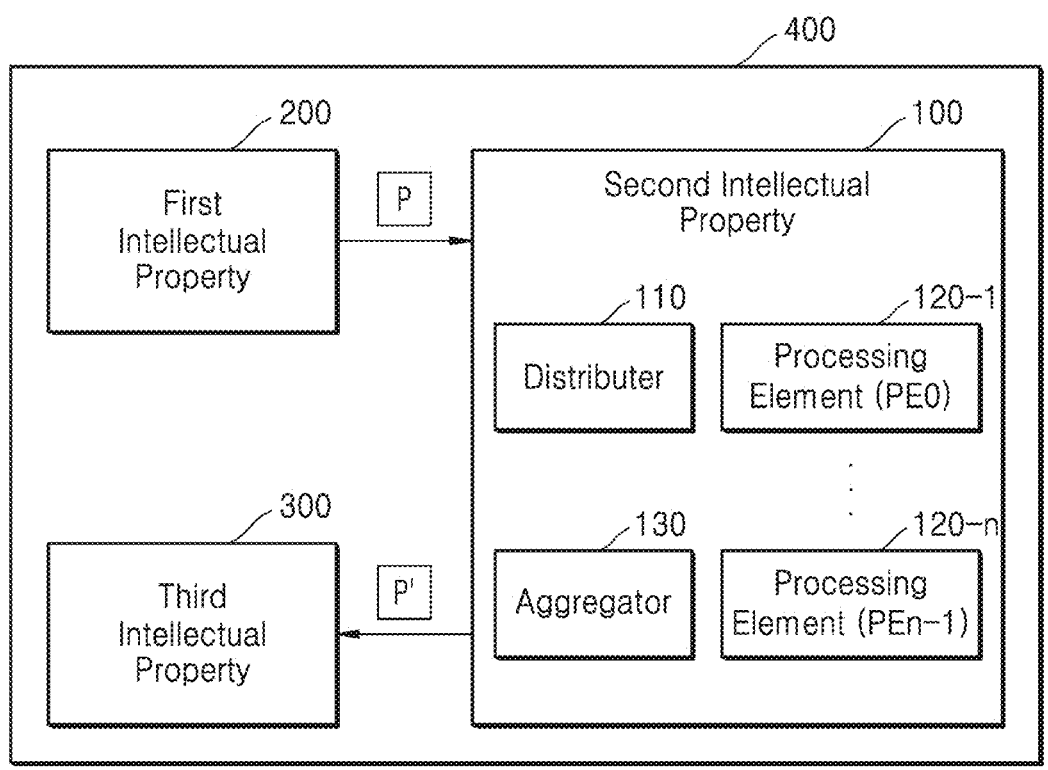
FIG. 13 is a block diagram illustrating an example of a system-on-chip according to an example embodiment of the inventive concepts.

FIG. 13 is a block diagram illustrating a system-on-chip 400 according to an example embodiment of the inventive concepts.

Referring to FIG. 13, the system-on-chip 400 may include a first IP 200, a second IP 100 corresponding to the IP 100 in FIG. 1, and a third IP 300.

The first IP 200 may transmit a plurality of request packets to the second IP 100, the second IP 100 may generate a plurality of response packets after performing a particular operation based on the received plurality of request packets, and the third IP 300 may receive the plurality of response packets from the second IP 100.

According to an example embodiment, after the second IP 100 transmits the response packet to the third IP 300, the second IP 100 may receive the packet again from the third IP 300. In addition, the received packet (hereinafter, referred to as a return packet) may be a packet that needs to be processed again by a processing element (hereinafter, referred to as a target processing element) that generated the response packet sent to the third IP 300.

Even in such a situation, the aggregator 130 of the second IP 100 may include and output the processing element identifier PE ID, which generated the corresponding packet, in the header of each of the response packet, such that the second IP 100 may clearly determine the target processing element. In addition, the third IP 300 may generate the return packet including the target processing element identifier and transmit the return packet to the second IP 100. In addition, the distributer 110 of the second IP 100 may identify the target processing element identifier included in the return packet and distribute the return packet to the target processing element.

Although the system-on-chip 400 is illustrated and described as including three IP in FIG. 13, the system-on-chip 400 may only include the first IP 200 and the second IP 100 in an implementation. In detail, the first IP 200 may transmit a plurality of request packets to the second IP 100 and receive a plurality of response packets from the second IP 100. In addition, the first IP 200 may generate a return packet and transmit the return packet to the second IP 100, and the second IP 100 may distribute the return packet to a corresponding target processing element based on a target processing element identifier included in the return packet.

As described above, since the system-on-chip according to an example embodiment of the inventive concepts includes an IP processing packets by using a plurality of processing elements, the performance may be improved.

In addition, since the system-on-chip may apply a method of increasing the processing performance for each packet type by distributing packets according to a scheduling policy determined based on the packet type, rather than distributing the packets in a consistent method, the performance may be improved.

In addition, as the second IP uses the distributer and the aggregator, the first IP and the third IP may operate the same as when transmitting or receiving packets to an IP having one processing element, the performance of the system-on-chip may be improved without making design changes of the first IP or the third IP.

Figure 14:
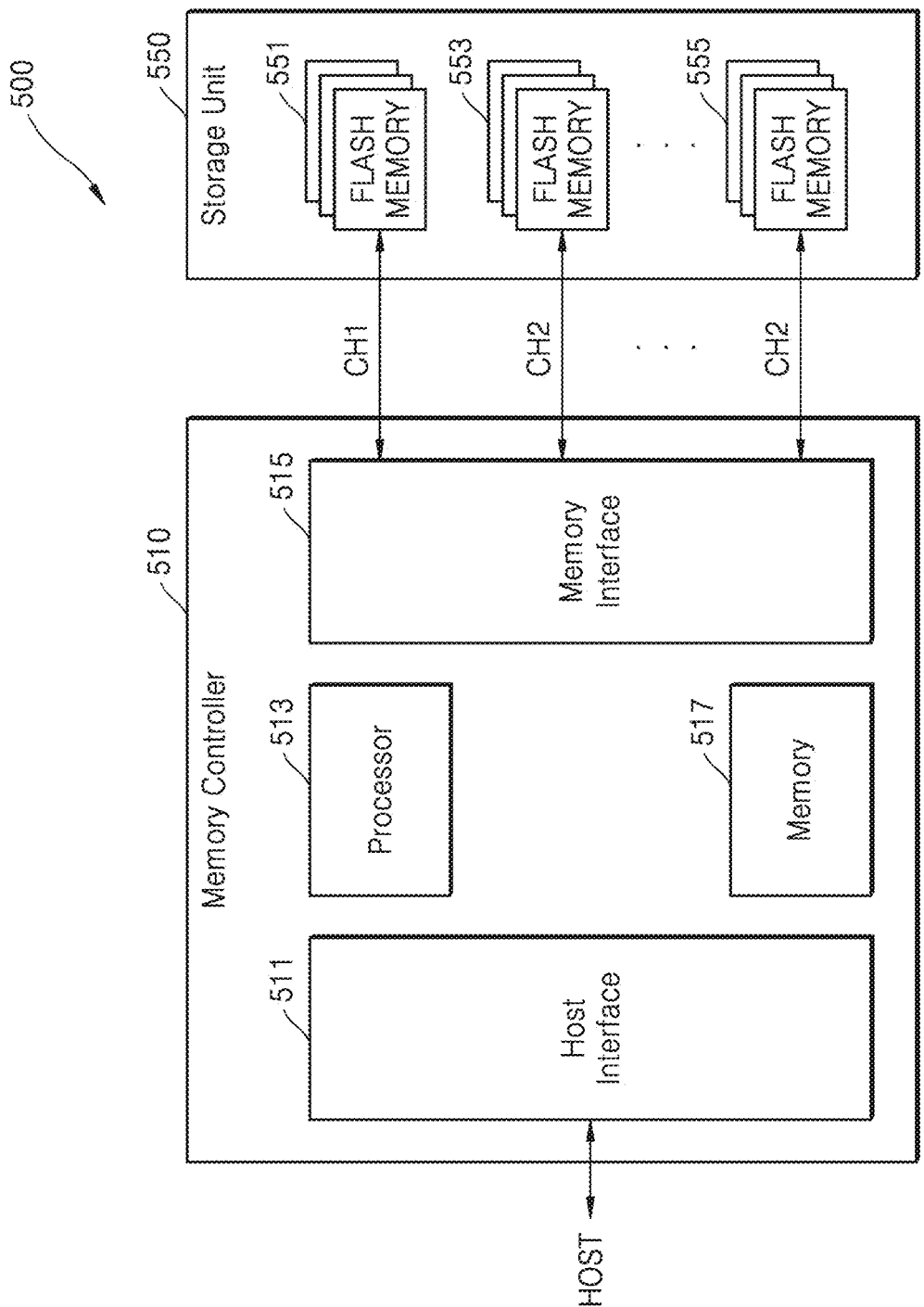
FIG. 14 is a block diagram illustrating an example of a storage device according to an example embodiment of the inventive concepts.

FIG. 14 is a block diagram illustrating an example embodiment of a storage device 500 according to an example embodiment of the inventive concepts.

Referring to FIG. 14, the storage device 500 may include a solid state drive SSD which is a flash-based storage system, and may include a memory controller 510 and a storage unit 550. The storage unit 550 may include a non-volatile memory such as a flash memory.

The memory controller 510 may include a host interface 511, a processor 513, a memory interface 515, and a memory 517. The processor 513 may correspond to the first IP 200 in FIG. 13, the memory interface 515 may correspond to the second IP 100 in FIG. 13, and the memory 517 may correspond to the third IP 300 in FIG. 13.

The host interface 511 may interface data exchange between a host and the storage device 500 which are connected through a high-speed bus. A bus format of the host interface 511 may include a universal serial bus (USB), a small computer systems interface (SCSI), a peripheral component interconnect express (PCI-E), an advanced technology attachment (ATA), a parallel ATA (PATA), a serial ATA (SATA), or the like. The host interface 511 may receive a control command or data from the host. In addition, the host interface 511 may transmit, to the processor 513, the control command or data output from the host through an internal bus.

The processor 513 may control an overall operation of the storage device 500. The processor 513 may control an exchange of data between the host and the host interface 511. The processor 513 may generally control the storage device 500 to perform an operation according to a control command output from the host. The processor 513 may receive, from the host, a control command or data through the internal bus. The processor 513 may transmit the control command or data to the memory 517 or the memory interface 515.

The memory interface 515 may interface data exchange between the storage unit 550 and the memory controller 510. The memory interface 515 may receive a packet including the control command or data from the processor 513 to perform an operation corresponding to the command.

For example, when a request packet including a read command is received from the processor 513, the memory interface 515 may read data corresponding to the command from the storage unit 550 to output a response packet including the corresponding data.

The memory interface 515 may include one or more channels connected to the storage unit 550, for example, k channels (k is a positive integer). A plurality of flash memories 551 to 555 may be electrically connected to each of the channels CH1 to CHk. According to an example embodiment, memories of the same type may be connected one channel among the plurality of channels CH1 to CHk, and memories of other types or the same type may be connected to other channels.

The memory 517 may be provided as a temporary storage space of the processor 513. The memory 517 may include a non-volatile memory capable of storing program codes controlling operations of the processor 513, such as a boot ROM, and a volatile memory capable of storing data exchanged between the host and the processor 513, such as a dynamic random access memory (DRAM), or a static random access memory (SRAM). Herein, the DRAM may be used as a cache memory or as a write buffer memory.

The elements of FIGS. 1 through 14 described above, such as the disturber 110, processing elements 120-1 to 120-n, and aggregator 130, may be implemented in processing circuitry such as hardware including logic circuits; a hardware/software combination such as a processor executing software; or a combination thereof and memory. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc., and the memory may include various volatile or non-volatile memory devices configured to store information, such as the blocking table 140, the FIFO 150 and the ordering pending FIFO 160. The processing circuitry may special purpose processing circuitry that improves processing performance by using a plurality of processing elements while not requiring design changes of surrounding components.

While the inventive concepts has been particularly shown and described with reference to some example embodiments thereof, it will be understood that various changes in form and details may be made therein without departing from the spirit and scope of the following claims.

What is claimed is:

1. A system-on-chip comprising:
    first processing circuitry configured as a first intellectual property (IP) to generate a plurality of request packets; and
    second processing circuitry configured as a second IP to generate a plurality of response packets based on the plurality of request packets by,
        determining a scheduling policy based on a request type associated with the plurality of request packets,
        distributing the plurality of request packets to a plurality of processing elements according to the scheduling policy when the plurality of request packets are input from the first IP,
        processing, via the plurality of processing elements, the plurality of request packets to generate the plurality of response packets such that a header of each of the plurality of response packets includes an identifier (PE ID) of a respective one of the plurality of processing elements which processed a respective one of the plurality of request packets, and
        aggregating the plurality of response packets according to the scheduling policy prior to outputting the plurality of response packets outside of the system-on-chip such that the plurality of response packets are selectively reordered based on the PE ID to match an order that the plurality of request packets were distributed to the plurality of processing elements, in response to the request type being a write request.

2. The system-on-chip of claim 1,
    wherein the scheduling policy includes at least a broadcast policy, a modular policy, and a round robin policy, and
    wherein the aggregating the plurality of response packets according to the scheduling policy includes selectively delaying outputting accumulated ones of the plurality of response packets until after all of the plurality of processing elements have processed respective ones of the plurality of request packets distributed thereto, in response to the scheduling policy being the broadcast policy.

3. The system-on-chip of claim 2, wherein the second processing circuitry is configured to include a distributer configured to,
    determine the scheduling policy as the broadcast policy, when the request type is an erase request or a trim request, and
    determine the scheduling policy as the modular policy or the round robin policy, when the request type is a read request or the write request.

4. The system-on-chip of claim 3, wherein the plurality of processing elements are configured to process data previously allocated to the plurality of processing elements, when the request type is the erase request or the trim request.

5. The system-on-chip of claim 4, wherein the second processing circuitry is configured to include an aggregator configured to generate a final response packet, when the request type is the erase request or the trim request and a number of response packets received from the plurality of processing elements corresponds to a number of the plurality of processing elements.

6. The system-on-chip of claim 3, wherein the distributer is configured to distribute the plurality of request packets to the plurality of processing elements based on a value obtained by applying a remainder arithmetic to a value described in a field of a header of the plurality of request packets, when the scheduling policy is the modular policy.

7. The system-on-chip of claim 3, wherein the distributer is configured to,
    check a value described in a field of the header of the plurality of request packets, when the scheduling policy is determined to be the round robin policy, and
    determine a distribution of a second request packet having a first value described in the field to be pending, when a first request packet having the first value described in the field is being processed by one of the plurality of processing elements.

8. The system-on-chip of claim 7, wherein the distributer is configured to distribute the second request packet to one of the plurality of processing elements, when processing of the first request packet is complete.

9. The system-on-chip of claim 1, wherein the second processing circuitry is configured to,
    determine whether to order the response packets based on the request type of each of the plurality of request packets,
    generate information with respect to a distribution order of the plurality of request packets, and
    aggregate the plurality of response packets according to information indicating the distribution order and the scheduling policy.

10. The system-on-chip of claim 1, wherein the second processing circuitry is configured to,
    transmit, to the first IP, the response packets, and
    check a checked processing element corresponding to the PE ID in the header of at least one return packet and distribute the at least one return packet to the checked processing element, when the at least one return packet corresponding to the plurality of response packets is received from the first IP.

11. An integrated circuit device comprising:
    processing circuitry configured to function as an intellectual property (IP) to generate a plurality of response packets by,
        determining a scheduling policy based on a request type associated with a plurality of request packets, when the plurality of request packets are input from the outside,
        distributing the plurality of request packets to a plurality of processing elements according to the scheduling policy, the plurality of processing elements configured to generate the plurality of response packets such that a header of each of the plurality of response packets includes an identifier (PE ID) of a respective one of the plurality of processing elements which processed a respective one of the plurality of request packets, and aggregating the plurality of response packets according to the scheduling policy such that the plurality of response packets are selectively reordered based on the PE ID to match an order that the plurality of request packets were distributed to the plurality of processing elements, in response to the request type being a write request.

12. A packet processing method comprising:
determining a scheduling policy based on a request type associated with a plurality of request packets, when the plurality of request packets are input;
distributing the plurality of request packets to a plurality of processing elements according to the scheduling policy;
processing the plurality of request packets through the plurality of processing elements to generate a plurality of response packets such that a header of each of the plurality of response packets includes an identifier (PE ID) of a respective one of the plurality of processing elements which processed a respective one of the plurality of request packets; and
aggregating the plurality of response packets according to the scheduling policy such that the plurality of response packets are selectively reordered based on the PE ID to match an order that the distributing distributed the plurality of request packets to the plurality of processing elements, in response to the request type being a write request.

13. The method of claim 12,
wherein the scheduling policy includes at least one of a broadcast policy, a modular policy, and a round robin policy, and
wherein the aggregating the plurality of response packets according to the scheduling policy includes selectively delaying outputting accumulated ones of the plurality of response packets until after all of the plurality of processing elements have processed respective ones of the plurality of request packets distributed thereto, in response to the scheduling policy being the broadcast policy.

14. The method of claim 13, wherein the determining of the scheduling policy comprises:
determining the scheduling policy as the broadcast policy, when the request type is an erase request or a trim request, and
determining the scheduling policy as the modular policy or the round robin policy, when the request type is a read request or the write request.

15. The method of claim 14, wherein the plurality of processing elements are configured to process data previously allocated to the plurality of processing elements, when the request type is the erase request or the trim request.

16. The method of claim 15, wherein the aggregating of the plurality of response packets comprises:
checking whether a number of response packets corresponds to a number of the plurality of processing elements, when the request type is the erase request or the trim request, and
generating a final response packet, when the number of response packets corresponds to the number of the plurality of processing elements.

17. The method of claim 14, wherein the distributing of the plurality of request packets comprises:
checking a value described in a field of the header of the plurality of request packets, when the scheduling policy is determined as the modular policy; and
distributing the plurality of request packets to the plurality of processing elements based on a value obtained by applying a remainder arithmetic to the value.

18. The method of claim 14, wherein the distributing of the plurality of request packets comprises,
checking a value described in a field of the header of each of the plurality of request packets, when the scheduling policy is the round robin policy; and
determining a distribution of a second request packet having a first value described in the field to be pending, when a first request packet having the first value described in the field is being processed by one of the plurality of processing elements.

19. The method of claim 18, wherein the distributing of the plurality of request packets further comprises:
distributing the second request packet to one of the plurality of processing elements, when processing of the first request packet is complete.

20. The method of claim 12, further comprising:
determining whether ordering is required based on the request type of the plurality of request packets; and wherein
the aggregating of the plurality of response packets includes, aggregating the plurality of response packets according to information indicating a distribution order and the scheduling policy, when ordering is required.

* * * * *